United States Patent [19]

Ohta et al.

[11] Patent Number: 4,937,316

[45] Date of Patent: Jun. 26, 1990

[54] PROCESS FOR PREPARING POLYIMIDES

[75] Inventors: Masahiro Ohta; Saburo Kawashima; Katsuaki Iiyama; Shoji Tamai; Hideaki Oikawa; Akihiro Yamaguchi, all of Kanagawa, Japan

[73] Assignee: Amdahl Corporation, Sunnyvale, Calif.

[21] Appl. No.: 313,732

[22] Filed: Feb. 22, 1989

[30] Foreign Application Priority Data

| Feb. 25, 1988 | [JP] | Japan | 63-040706 |
| Feb. 29, 1988 | [JP] | Japan | 63-044619 |
| Mar. 1, 1988 | [JP] | Japan | 63-045781 |
| Mar. 1, 1988 | [JP] | Japan | 63-045780 |
| Dec. 15, 1988 | [JP] | Japan | 63-315086 |
| Dec. 15, 1988 | [JP] | Japan | 63-315087 |
| Dec. 15, 1988 | [JP] | Japan | 63-315088 |
| Dec. 16, 1988 | [JP] | Japan | 63-316122 |

[51] Int. Cl.$^5$ .................................. C08G 69/26
[52] U.S. Cl. .................................. 528/353; 528/125; 528/126; 528/128; 528/172
[58] Field of Search ............... 528/353, 125, 126, 128, 528/172

[56] References Cited

U.S. PATENT DOCUMENTS 3,998,786  12/1976  D'Alelio .......................... 528/353

FOREIGN PATENT DOCUMENTS 1520519  11/1969  Fed. Rep. of Germany .

Primary Examiner—Morton Foelak
Attorney, Agent, or Firm—Fliesler, Dubb, Meyer & Lovejoy

[57] ABSTRACT

A process for preparing a polyimide by reaction of a diamine and a tetracarboxylic dianhydride to obtain a polyamide acid and subjecting the polyamide acid to conversion into a polyimide thermally or chemically. The reaction in the process is carried out in the presence of at least one dicarboxylic anhydride selected from the group consisting of aliphatic dicarboxylic anhydrides and aromatic dicarboxylic anhydrides, and the amount of the tetracarboxylic dianhydride is in the range of from 0.9 to 1.0 mole per mole of the diamine and the amount of the dicarboxylic anhydride is in the range of from 0.001 to 1.0 mole per mole of the diamine. The resultant polyimides exhibit good thermal stability at high temperatures and good forming processability even at low temperatures.

4 Claims, 24 Drawing Sheets

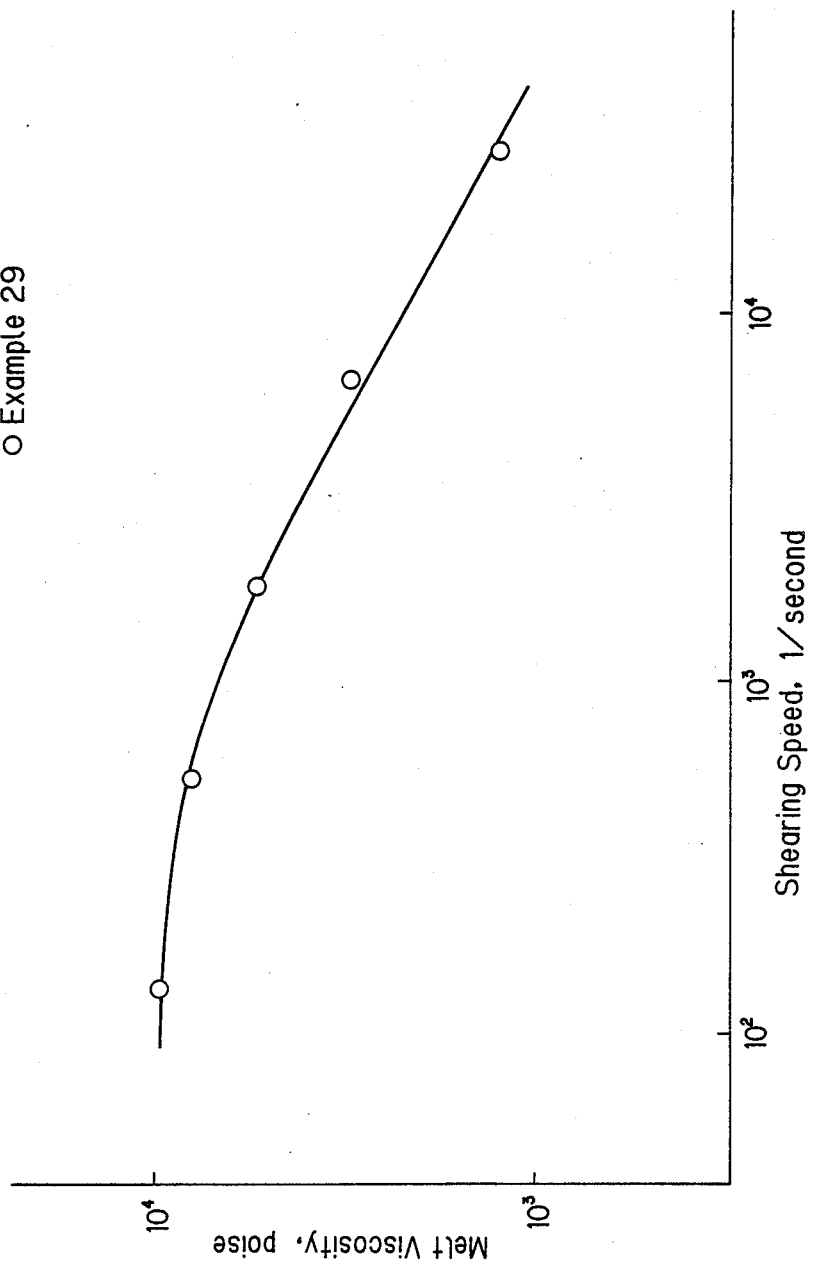

PROCESS FOR PREPARING POLYIMIDES

BACKGROUND OF THE INVENTION

1. Field of the Invention

This invention relates to a polyimide resin for melt forming and more particularly, to a process for preparing a polyimide which has good thermal stability and good forming processability.

2. Description of the Prior Art

Polyimides obtained by reaction between tetracarboxylic dianhydrides and diamines have been heretofore used in the fields of electric and electronic apparatus, aerospace apparatus and transportation apparatus since they have, aside from high heat resistance, good mechanical strength and dimensional stability along with inflammability and electric insulating properties. They are expected to be widely employed in the fields requiring a high heat resistance.

However, some polyimides have a good heat resistance, but do not have a distinct glass transition point, so that when applied as a forming material, they have to be processed by the use of a sinter molding technique. Alternatively, some polyimides exhibit good processability but have a low glass transition temperature and are soluble in halogenated hydrocarbons, thus being not satisfactory with respect to the heat and solvent resistances. Hence, known polyimides have merits and demerits in performance.

The present inventors had proposed polyimides of recurring units of the following formulae (I) to (IV) which have good mechanical, thermal and electrical properties and good resistances to solvent and heat:

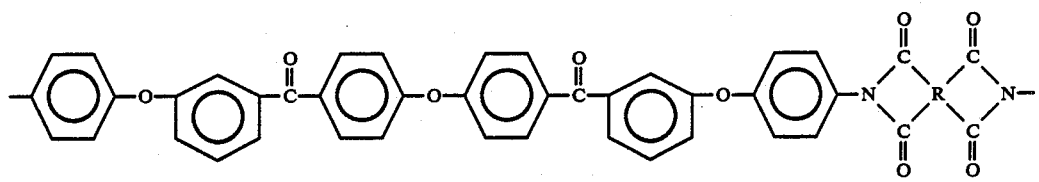

(Japanese Patent Application No. 62-076095)

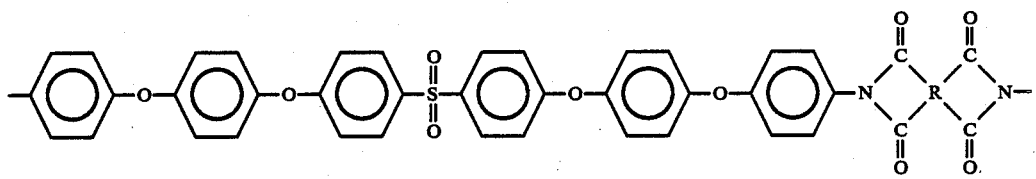

(Japanese Patent Application Nos. 62-163940 and 62-163941)

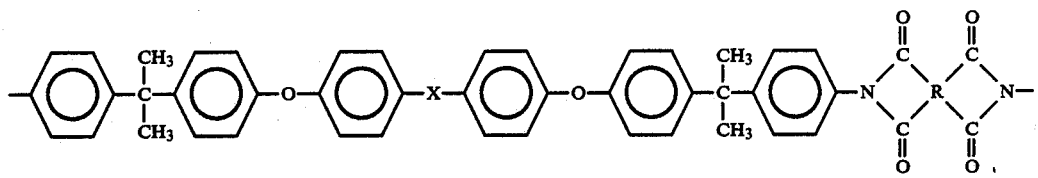

(Japanese Laid-open Patent Application No. 62-53388)

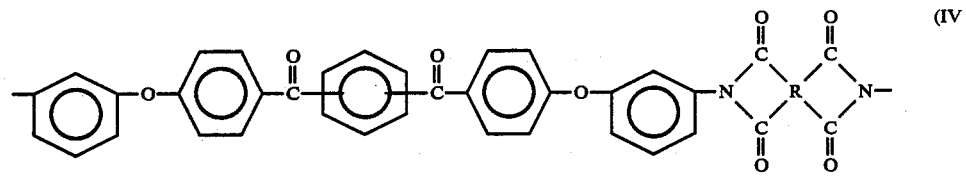

(IV)

(Japanese Laid-open Patent Application No. 62-50372).

In the above formulae, each X represents a carbonyl group or a sulfonyl group, and each R represents a tetravalent group selected from the group consisting of aliphatic groups having 2 or more carbon atoms, alicyclic groups, monocyclic aromatic groups, condensed polycyclic aromatic groups, and non-condensed polycyclic aromatic groups where aromatic groups are connected directly to each other or through crosslinkage.

These polyimides have good fluidity and good processability, but when they are kept at high temperatures over a long term (e.g. when they are retained over a long time at high temperatures in a cylinder at the time of injection molding), the fluidity of the resin melt gradually decreases with an attendant decrease in forming processability.

Moreover, the above polyimides may undergo melt forming at high temperatures, but there is a demand of the development of polyimides which exhibit stable fluidity when formed at lower temperatures.

SUMMARY OF THE INVENTION

An object of the invention is to provide polyimides which have good thermal stability aside from good characteristic properties inherent to a polyimide and whose forming processability does not decrease when kept at high temperatures over a long term.

Another object of the invention is to provide polyimides which exhibit, aside from good properties inherent to a polyimide, stable fluidity even at low temperatures and good forming processability.

According to the present invention, there is provided a process for preparing a polyimide which comprises reacting a diamine and a tetracarboxylic dianhydride to obtain a polyamide acid and subjecting the thus obtained polyamide acid to conversion into a polyimide thermally or chemically, characterized in that the reaction is carried out in the presence of at least one dicarboxylic anhydride selected from the group consisting of aliphatic dicarboxylic anhydrides and aromatic dicarboxylic anhydrides and that the amount of the tetracarboxylic acid dianhydride is in the range of from 0.9 to 1.0 mole per mole of the diamine and the amount of the dicarboxylic anhydride is in the range of from 0.001 to 1.0 mole per mole of the diamine.

BRIEF DESCRIPTION OF THE DRAWINGS

FIGS. 13, 15, 16, 18, 19, 21, 22 and 24 are, respectively, graphs showing the relationship between the melt viscosity and the shearing speed of polyimides.

DETAILED DESCRIPTION OF THE INVENTION

Figure 1:
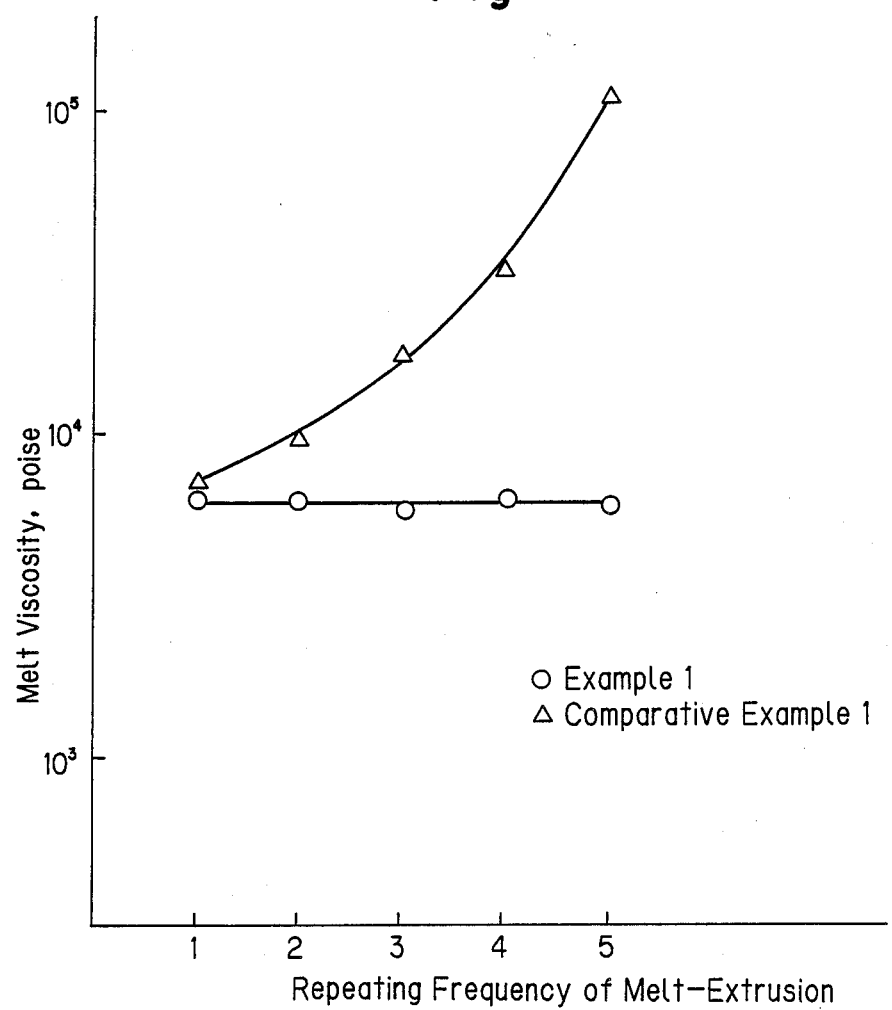
FIGS. 1, 3, 4, 6, 7, 9, 10 and 12 are, respectively, graphs showing the relationship between the repeating frequency of melt extrusion and the melt viscosity o polyimides.

In the practice of the invention, diamines may be any ones which have been conventionally used for the preparation of polyimide. Preferably, ether diamine compounds are used. Specific examples include 1,4-bis[4-(3-aminophenoxy)benzoyl] benzene, 1,3-bis[4-(3-aminophenoxy)benzoyl} benzene, bis{4-[4-(4-aminophenoxy)-phenoxy]phenyl} sulfone, bis{4-[3-(4-aminophenoxy)-benzoyl]phenyl} ether, 4,4'-bis[4-(4-amino-a, α-dimethylbenzyl)) phenoxybenzophenone, and bis{4-[4-(4-amino-a, α-dimethylbenzyl)phenoxy]phenyl} sulfone. These compounds may be used singly or in combination.

Part of the diamine may be substituted with other diamines in amounts not impeding good physical properties of the polyimide obtained according to the process of the invention.

The diamines which can be used as a substitute for part of the defined diamines include, for example, m-phenylenediamine, o-phenylenediamine, p-phenylenediamine, m-aminobenzylamine, p-aminobenzylamine, bis(3-aminophenyl) ether, (3-aminophenyl) (4-aminophenyl) ether, bis(4-aminophenyl) ether, bis(3-aminophenyl) sulfide, (3-aminophenyl) (4-aminophenyl) sulfide, bis(4-aminophenyl) sulfide, bis(3-aminophenyl) sulfoxide, (3-aminophenyl) (4-aminophenyl) sulfoxide, bis(3-aminophenyl) sulfone, (3-aminophenyl)(4-aminophenyl) sulfone, bis(4-aminophenyl) sulfone, 3,3'-diaminobenzophenone, 3,4-diaminobenzophenone, 4,4'-diaminobenzophenone, bis[4-(3-aminophenoxy)phenyl]methane, 1,1-bis[4-(3-aminophenoxy)phenyl]ethane, 2,2-bis[4-(3-aminophenoxy)phenyl]propane, 2-[4-(3-aminophenoxy)phenyl]-2-[4-(3-aminophenoxy)-3-methylphenyl]propane, 2,2-bis[3-methylphenyl]propane, 2-[4-(3-aminophenoxy)phenyl]-2-[4-(3-aminophenoxy)-3,5-dimethylphenyl]propane, 2,2-bis-(3-aminophenoxy)-3,5-dimethylphenyl]propane, 2,2-bis[4-(3-aminophenoxy)phenyl]butane, 2,2-bis[4-(3aminophenoxy)phenyl]-1,1,1,3,3,3-hexafluoropropane, 4,4'-bis(3-aminophenoxy)-3-methylbiphenyl, 4,4'-bis(3-aminophenoxy)-3,3'-dimethylbiphenyl, 4,4'-bis(3-aminophenoxy)-3,5-dimethylbiphenyl, 4,4'-bis(3-aminophenoxy)-3,3',5,5'-tetramethylbiphenyl, 4,4-bis(3-aminophenoxy)-3,3'-dichlorobiphenyl, 4,4'-bis(3-aminophenoxy)-3,5'-dichlorobiphenyl, 4,4'-bis(3-aminophenoxy)-3,3',5,5'-tetrachlorobiphenyl, 4,4'-bis(3-aminophenoxy)-3,3'-dibromobiphenyl, 4,4'-bis(3-aminophenoxy)-3,5-dibromobiphenyl, 4,4'-bis(3-aminophenoxy)-3,3',5,5'-tetrabromobiphenyl, bis[4-(3-aminophenoxy)phenyl]ketone, bis[4-(3-aminophenoxy)-phenyl]sulfide, bis[4-(3-aminophenoxy)-3methoxyphenyl]sulfide, [4-(3-aminophenoxy)phenyl][4-(3-aminophenoxy)-3,5-dimethoxyphenyl] sulfide, bis[4-(3-aminophenoxy)-3,5-dimethoxyphenyl] sulfide, bis[4-(3-aminophenoxy)phenyl] sulfide, bis[4-(4-aminophenoxy)phenyl] methane, 1,1-bis[4-(4-aminophenoxy)phenyl]ethane, 1,2-bis[4-(4-aminophenoxy)phenyl]ethane, 2,2-bis[4-(4-aminophenoxy)phenyl]propane, 2,2-bis[4-(4-aminophenoxy)phenyl]butane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,3 bis(4-aminophenoxy)benzene, 1,4-bis(3-aminophenoxy)benzene, 1,4-bis(4-aminophenoxy)benzene, 4,4'-bis(4 -aminophenyl)biphenyl, bis[4-(4-aminophenoxy)phenyl] ketone, bis[4-(4-aminophenoxy)phenyl] sulfide, bis[4-(4-aminophenoxy)phenyl] sulfoxide, bis[4 (4-aminophenoxy)phenyl] sulfone, bis[4-(3-aminophenoxy)phenyl] ether, bis[4-(4 -aminophenoxy)phenyl] ether, 1, benzoyl]benzene, and the like.

The tetracarboxylic dianhydrides used in the present invention are preferably those compounds of the following general formula (V).

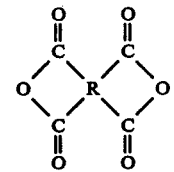
(V)

wherein R represents a tetravalent group selected from the group consisting of aliphatic groups having 2 or more carbon atoms, alicyclic groups, monocyclic aromatic groups, condensed polycyclic aromatic groups, and non-condensed polycyclic aromatic groups where aromatic groups are connected directly to each other or through crosslinkage.

Examples of the tetracarboxylic anhydrides include ethylenetetracarboxylic dianhydride, butanetetracarboxylic dianhydride, cyclopentanetetracarboxylic dianhydride, pyromellitic dianhydride, 1,1-(bis(2,3-dicarboxyphenyl)ethane dianhydride, bis(2,3-dicarboxyphenyl)methane dianhydride, bis(3,4-dicarboxyphenyl)methane dianhydride, 2,2-bis(3,4-dicarboxyphenyl)propane dianhydride, 2,2-bis(3,4-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, bis(3,4-dicarboxyphenyl) ether dianhydride, bis(2,3-dicarboxyphenyl ether dianhydride, bis(3,4-dicarboxyphenyl) sulfone dianhydride, 4,4'-(p-phenylenedioxy)diphthalic dianhydride, 4,4'-(m-phenylenedioxy)diphthalic dianhydride, 2,3,6,7-naphthalenetetracarboxylic acid dianhydride, 1,4,5,8-naphthalenetetracarboxylic acid dianhydride, 1,2,5,6-naphthalenetetracarboxylic acid dianhydride, 1,2,3,4-benzenetetracarboxylic acid dianhydride, 3,4,9,10-perylenetetracarboxylic acid dianhydride, 2,3,6,7-anthracenetetracarboxylic acid dianhydride, 1,2,7,8-phenanthrenetetracarboxylic acid dianhydride and the like. These tetracarboxylic acid dianhydrides may be used alone or in combination.

The process of the invention is characterized in that the reaction between the diamine and the tetracarboxylic dianhydride is effected in the presence of an aliphatic dicarboxylic anhydride and/or an aromatic dicarboxylic anhydride. The dicarboxylic anhydride contributes directly or indirectly to the reaction at the time of formation of polyimide and may constitute a part of the polyimide or perform the catalytic action on the formation reaction of the polyimide. Thus, it plays an important role for obtaining polyimide having good thermal stability and good forming processability.

The aliphatic dicarboxylic anhydrides may be represented by the following formula (VI)

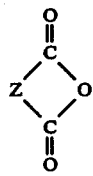

(VI)

wherein Z represents an aliphatic group or alicyclic group having from 1 to 10 carbon atoms.

Examples of such dicarboxylic anhydride include malonic anhydride, succinic anhydride, glutaric anhydride, adipic anhydride, pimelic anhydride, suberic anhydride, azelaic anhydride, sebacic anhydride, methylmalonic anhydride, ethylmalonic anhydride, dimethylmalonic anhydride, methylsuccinic anhydride, 2,2-dimethylsuccinic anhydride, 2,3-dimethylsuccinic anhydride, tetramethylsuccinic anhydride, maleic anhydride, citraconic anhydride, glutaconic anhydride, methylenesuccinic anhydride, allylmalonic anhydride, teraconic anhydride, muconic anhydride, cyclobutanedicarboxylic anhydride, cyclohexenedicarboxylic anhydride, camphoric anhydride and the like. These aliphatic and/or alicyclic dicarboxylic anhydrides may be used alone or in combination.

The aromatic dicarboxylic anhydrides are those compounds of the following formula (VII)

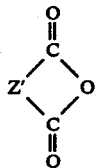

(VII)

wherein Z' represents a divalent group selected from the group consisting of monocyclic aromatic groups, condensed polycyclic aromatic groups, and non-condensed polycyclic aromatic groups where aromatic groups are connected directly to each other or through crosslinkage. Examples of such dicarboxylic anhydrides include phthalic anhydride, 2,3-benzophenonedicarboxylic anhydride, 3,4-benzophenonedicarboxylic anhydride, 2,3-dicarboxylphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride, 1,9-anthracenedicarboxylic anhydride, and the like. These may be used alone or in combination.

The amine, tetracarboxylic dianhydride and dicarboxylic anhydride are used at such molar ratios of 0.9 to 1.0 mole of the tetracarboxylic dianhydride and 0.001 to 1.0 mole of the dicarboxylic anhydride, each per mole of the diamine.

In order to regulate the molecular weight of a produced polyimide during the preparation of the polyimide, one can control the ratio between the diamine and the tetracarboxylic dianhydride. In the process of the invention, for obtaining a polyimide having good melt fluidity, the molar ratio of the tetracarboxylic dianhydride to the diamine is in the range of 0.9 to 1.0.

The coexisting dicarboxylic anhydride is used in an amount of from 0.001 to 1.0 by molar ratio to the diamine. If the amount is less than 0.001 mole, an intended polyimide of the invention having high thermal stability at high temperatures and good forming processability is not obtained. Over 1 mole, the mechanical characteristics lower. A preferable amount is in the range of from 0.01 to 0.5 by molar ratio.

In the process of the invention, the reaction may be effected in an organic solvent, if necessary. The organic solvents used for the reaction include, for example, N,N-dimethylformamide, N,N-dimethylacetamide, N,N-diethylacetamide, N,Ndimethylmethoxyacetamide, N-methyl-2-pyrrolidone, 1,3-dimethyl-2-imidazoline, N-methylcaprolactam, 1,2-dimethoxyethane, bis(2-methoxyethyl) ether, 1,2-bis(2-methoxyethoxy)ethane, bis{2-(2-methoxyethoxy)ethyl} ether, tetrahydrofuran, 1,3-dioxane, 1,4-dioxane, pyridine, picoline, dimethyl sulfoxide, dimethyl sulfone, tetramethylurea, hexamethylphosphoramide, phenol, m-cresol, p-cresol, p-chlorophenol, anisole, and the like. These organic solvents may be used alone or The methods wherein the starting diamine, tetracarboxylic dianhydride and dicarboxylic anhydride are added to and reacted in an organic solvent in accordance with the process of the invention include:

(1) a method wherein a diamine and a tetracarboxylic dianhydride are reacted, followed by addition of a dicarboxylic anhydride and continuing the reaction;

(2) a method wherein a diamine and a dicarboxylic anhydride are added and reacted, followed by addition of a tetracarboxylic dianhydride for further reaction; and (3) a method wherein a diamine, a tetracarboxylic dianhydride and a dicarboxylic anhydride are added simultaneously and reacted.

Any of the above manners of the addition and reaction may be used.

The reaction temperature is in the range of from 0° to 250° C. and is preferably at temperatures not higher than 60° C.

The reaction pressure is not critical and the reaction satisfactorily proceeds at normal pressures.

The reaction time may depend upon the types of diamine, tetracarboxylic dianhydride, dicarboxylic anhydride and solvent and the reaction temperatures and is usually in the range of from 4 to 24 hours.

The polyamide acid obtained by the reaction as set forth before is subsequently either thermally dehydrated at 100° to 400° C. or chemically imidized by the use of an ordinarily employed imidizing agent such as, for example, triethylamine and acetic anhydride, thereby obtaining the corresponding polyimides having fundamental skeletons of recurring units as shown in the afore-indicated formulae (I) to (IV).

In general, polyamide acids are formed at low temperatures, and subsequently subjected to imidation thermally or chemically. In this connection, a polyimide can be obtained by simultaneously effecting formation of the polyamide acid and thermal imidation reaction at temperatures of from 60° C. to 250° C. More particularly, a diamine, a tetracarboxylic dianhydride and a dicarboxylic anhydride are suspended or dissolved in an organic solvent and reacted under heating conditions to permit the formation of a polyamide acid and imidation by dehydration of the acid to proceed at the same time, thereby obtaining a polyimide.

Alternatively, there may be used a procedure wherein a tetracarboxylic dianhydride, a diamine and a dicarboxylic anhydride all in the form of powder are mixed without use of any organic solvent, followed by treatment in the presence or absence of a chemical imidizing agent to obtain a polyimide.

Where a polyimide of the invention is provided for melt forming, it is possible to formulate other thermoplastic resins in amounts not impeding the purposes of the invention. Such other resins include, for example, polyethylene, polypropylene, polycarbonates, polyarylates, polyamides, polysulfones, polyether sulfones, polyether ketones, polyphenylene sulfides, polyamide-imides, polyether imides, modified polyphenylene oxides and the like. Moreover, fillers which are used in ordinary resin compositions may be used in amounts not impeding the purposes of the invention. Examples of such fillers include abrasion resistance improvers such as graphite, carborundum, fluorite powder, molybdenum disulfide, fluororesins and the like, reinforcing agents such as glass fibers, carbon fibers, boron fibers, silicon carbide fibers, carbon whiskers, asbestos, metallic fibers, ceramic fibers and the like, flame retardants such as antimony trioxide, magnesium carbonate, calcium carbonate and the like, electric characteristic improvers such as clay, mica and the like, tracking resistance improvers such as asbestos, silica, graphite and the like, oxidation resistance improvers such as barium sulfate, silica, calcium metasilicate and the like, thermal conductivity improvers such as iron powder, zinc powder, aluminium powder, copper powder and the like, and glass beads, glass spheres, talc, diatomaceous earth, alumina, syrus balloons, hydrated alumina, metal oxides, colorants and the like.

EXAMPLES

The present invention is described in more detail by way of examples and comparative examples.

EXAMPLE 1

592 g (1.0 mole) of bis{4-[3-(4-aminophenoxy)-benzoyl]phenyl} ether and 4700 g of N,N-dimethylamide were charged into a reactor equipped with an agitator, a reflux condenser and a nitrogen-introducing tube, to which 207 g (0.95 moles) of pyromellitic anhydride was added at room temperature in an atmosphere of nitrogen portion by portion while not allowing the temperature of the solution to increase, followed by agitation at room temperature for about 20 hours.

To the resultant polyamide acid solution was added 29.6 g (0.2 moles) of phthalic anhydride at room temperature in an atmosphere of nitrogen, followed by further agitation for 1 hour. Subsequently, 404 g (4 moles) of triethylamine and 306 g (3 moles) of acetic anhydride were dropped into the solution and agitated at room temperature for 20 hours. The resultant reaction product was discharged into methanol and filtered, followed by dispersion in and washing with methanol, removal by filtration and drying at 180° C. for 2 hours to obtain 753 g of a polyimide powder. The polyimide powder had a glass transition temperature of 227° C. and a melting point of 385° C. (as determined by DSC herein and whenever appeared hereinafter). The polyimide powder had a logarithmic viscosity of 0.55 dl/g. It will be noted that the logarithmic viscosity is a value which is determined by measurement at 35° C. using a mixed solvent of para-chlorophenol:phenol (90:10 on the weight basis) and a concentration of 0.5 g/100 ml of the solvent.

The polyimide powder obtained in this example was subjected to repetition of measurement of a melt viscosity by the use of the Koka type flow tester (CFT-500, made by Shimadzu Co., Ltd.) using an orifice with a diameter of 0.1 cm and a length of 1 cm. After heating at 410° C. for 5 minutes, the content was extruded at a pressure of 100 kg/cm$^2$. The resultant strand was broken into pieces, followed by extrusion five times in total under the same conditions as set forth above.

The relation between the repeating frequency of melt extrusion and the melt viscosity is shown in FIG. 1.

The melt viscosity suffers little variation even when the number of repetitions increases, from which it will be seen that the thermal stability is good.

COMPARATIVE EXAMPLE 1

The general procedure of Example 1 was repeated except that the phthalic anhydride was not reacted, thereby obtaining 730 g of a polyimide powder.

The thus obtained polyimide powder had a logarithmic viscosity of 0.55 dl/g. The polyimide powder was subjected to a repeating test of melt viscosity by the use of such a flow tester as used in Example 1, with the results shown in FIG. 1.

When the number of repetitions increased, the melt viscosity increased and thus, the thermal stability was poorer as compared with the polyimide obtained in Example 1.

EXAMPLE 2

592 g (1.0 mole) of {4-[3-(4-aminophenoxy)benzoyl]phenyl} ether and 4700 g of dimethylacetamide were charged into a reactor apparatus as used in Example 1, to which 14.8 g (0.1 mole) of phthalic anhydride and 304.8 g (0.95 moles) of 3,3',4,4'-benzophenonetetracarboxylic dianhydride were added at room temperature in an atmosphere of nitrogen while not allowing the temperature of the solution to elevate, followed by agitation at room temperature for about 20 hours.

Thereafter, 404 g (4 moles) of triethylamine and 306 g (3 moles) of acetic anhydride were dropped into the solution. After agitation for further 20 hours, the reaction product was discharged into methanol and filtered, washed with methanol, and dried at 180° C. for 8 hours under reduced pressure to obtain 832 g of a light yellow polyimide powder. The polyimide powder had a glass transition temperature of 198° C. and a logarithmic viscosity of 0.53 dl/g.

Figure 2:
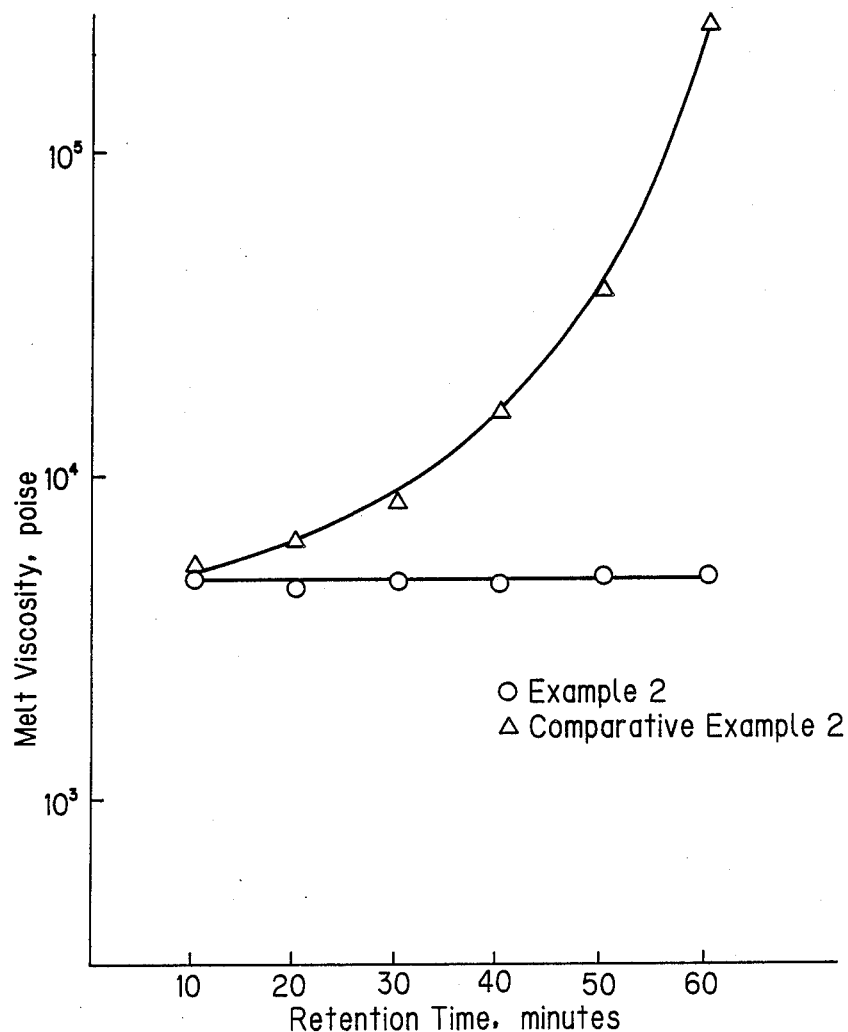
FIGS. 2, 5, 8, 11, 14, 17, 20 and 23 are, respectively, graphs showing the relationship between the retention time in a cylinder of a flow tester and the melt viscosity of polyimides.

The forming stability of the polyimide, obtained in this example was measured by changing the retention time in the cylinder of a flow tester. The temperature used was 320° C. and the pressure was 100 kg/cm². The results are shown in FIG. 2. The increase in the retention time in the cylinder involved little change in the melt viscosity, revealing good thermal stability.

COMPARATIVE EXAMPLE 2

In the same manner as in Example 2 without use of the phthalic anhydride, there was obtained a light yellow polyimide powder.

The polyimide powder had a glass transition temperature of 198° C. and a logarithmic viscosity of 0.53 dl/g. In the same manner as in Example 2, the retention time in the cylinder of the flow tester was changed to measure a melt viscosity, with the result that the melt viscosity increased with an increasing retention time, thus the thermal stability being poorer when compared with the polyimide obtained in Example 2.

EXAMPLE 3

592 g (1.0 mole) of bis{4-[3-(4-aminophenoxy)benzoyl]phenyl} ether, 297.6 g (0.96 mole of bis(3,4-dicarboxyphenyl) ether dianhydride, 11.84 g (0.08 moles) of phthalic anhydride and 5100 g of m-cresol were charged into a reactor as used in Example 1, and heated under agitation in an atmosphere of nitrogen up to 150° C., followed by continuing agitation for 4 hours, cooling, charging into the resultant reaction product into methanol and filtration to obtain a polyimide powder.

The polyimide powder was washed with methanol and acetone and drying at 180° C. for 8 hours under reduced pressure to obtain 826 g of a polyimide powder.

The polyimide powder had a logarithmic viscosity of 0.57 dl/g and a glass transition temperature of 189° C.

Figure 3:
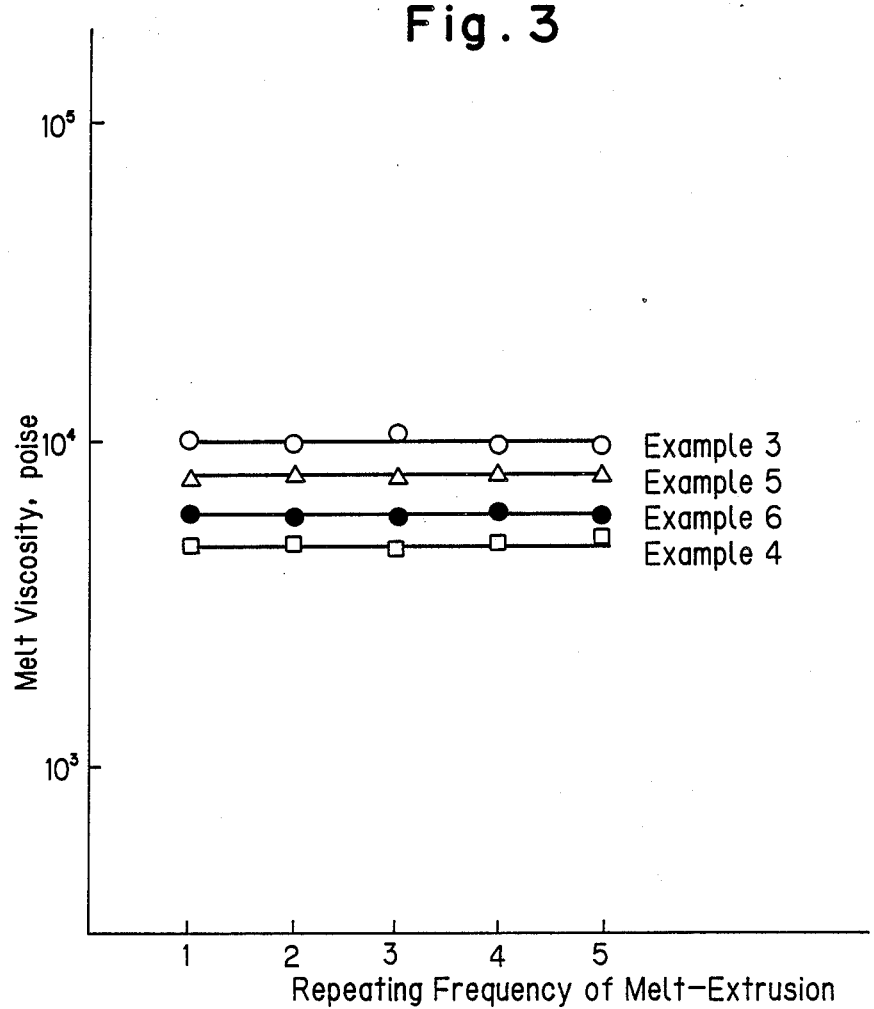

In the same manner as in Example 1, the melt viscosity was measured by repeated extrusion by the use of a flow test at a temperature of 300° C. and a pressure of 100 kg/cm², revealing that little variation in the melt viscosity depending upon the number of repetitions was found. The results are shown in FIG. 3.

EXAMPLES 4–6

The general procedure of Example 1 was repeated using a reactor as used in Example 1 except that the type and amount of tetracarboxylic dianhydride, the amount of the dimethylacetamide and the amount of the phthalic anhydride were changed as shown in Table 1, thereby obtaining polyimide powders. The glass transition temperature and the logarithmic viscosity of the thus obtained polyimide powders are also shown in the table.

These polyimide powders were each repeatedly subjected to extrusion with a flow tester fully in the same manner as in Example 1 to measure a melt viscosity of the respective powders. The results are shown in FIG. 3 along with those of Example 3.

It will be noted that the extrusion conditions of the flow tester are also shown in Table 1.

TABLE 1

| | Type of Diamine, Amount (g(moles)) | Type of Tetracarboxylic dianhydride, Amount (g(moles)) | Amount of phthalic anhydride Amount (g(moles)) | Amount of N,N-Dimethyl-acetamide (g) | Physical Properties of Polyimide | | Flow Test Conditions | | |
|---|---|---|---|---|---|---|---|---|---|
| | | | | | Logarithmic Viscosity (dl/g) | Glass Transition Temp. (°C.) | Temp. (°C.) | Pressure (kg/cm²) | Retention Time (minutes) |
| Example 4 | bis{4-[3-(4-aminophenoxy)benzoyl]phenyl}ether 592 g (1.0 mole) | 3,3',4,4'-biphenyltetracarboxylic dianhydride 280 g (0.95 moles) | 22.2 g (0.15 moles) | 5070 g | 0.54 | 196 | 320 | 100 | 5 |
| Example 5 | bis{4-[3-(4-aminophenoxy)benzoyl]phenyl}ether 592 g (1.0 mole) | 4,4'(p-phenylenedioxy)diphthalic dianhydride 382 g (0.95 moles) | 44.4 g (0.3 moles) | 5770 g | 0.56 | 172 | 320 | 100 | 5 |
| Example 6 | bis{4-[3-(4-aminophenoxy)benzoyl]phenyl}ether 473.6 g (0.8 moles) bis(4-aminophenyl)ether 40 g (0.2 moles) | pyromellitic dianhydride 204.9 g (0.94 moles) | 71.0 g (0.48 moles) | 4770 g | 0.52 | 243 | 380 | 100 | 5 |

EXAMPLE 7

616.7 9 (1.0 mole) of bis{4-[4-(4-aminophenoxy)phenoxy]phenyl}}sulfone and 5215 9 of N,N-dimethylacetamide were charged into a reactor equipped with an agitator, a reflux condenser and a nitrogen-introducing tube, to which 207.1 9 (0.95 moles) of pyromellitic anhydride was added at room temperature in an atmosphere of nitro9en portion by portion while not allowing the temperature of the solution to increase, followed by aqitation at room temperature for about 20 hours. The resultant polyamide acid had a lo9arithmic viscosity of 0.56 dl/9. The logarithmic viscosity was a value which was measured at 35° C. using N,N-dimethylacetamide as a solvent and a concentration of 0.5 g/100 ml of the solvent. To the polyamide acid solution was added 22.2 g (0.15 moles) of phthalic anhydride at room temperature in an atmosphere of nitrogen, followed by further agitation for 1 hour. Subsequently, 404 g (4 moles) of triethylamine and 306 g (3 moles) of acetic anhydride were dropped into the solution. About 2 hours after completion of the dropping, a yellow polyimide powder started to precipitate. The solution was further agitated at room temperature for 20 hours, and the resultant reaction product was discharged into methanol and filtered, followed by dispersion in and washing with methanol, removal by filtration and drying at 180° C. for 2 hours to obtain 783 g of a polyimide powder. The polyimide powder had a glass transition temperature of 285° C. and a melting point of 420° C. (as determined by DSC herein and whenever appeared hereinafter). The polyimide powder had a logarithmic viscosity of 0.55 dl/g.

The polyimide powder obtained in this example was subjected to repetition of measurement of a melt viscosity by the use of the Koka type flow tester (CFT-500, made by Shimadzu Co., Ltd.) using an orifice with a diameter of 0.1 cm and a length of 1 cm. After keeping at 440° C. for 5 minutes, the content was extruded at a pressure of 100 kg/cm$^2$. The resultant strand was broken into pieces, followed by successive extrusion five times in total under the same conditions as set forth above.

Figure 4:
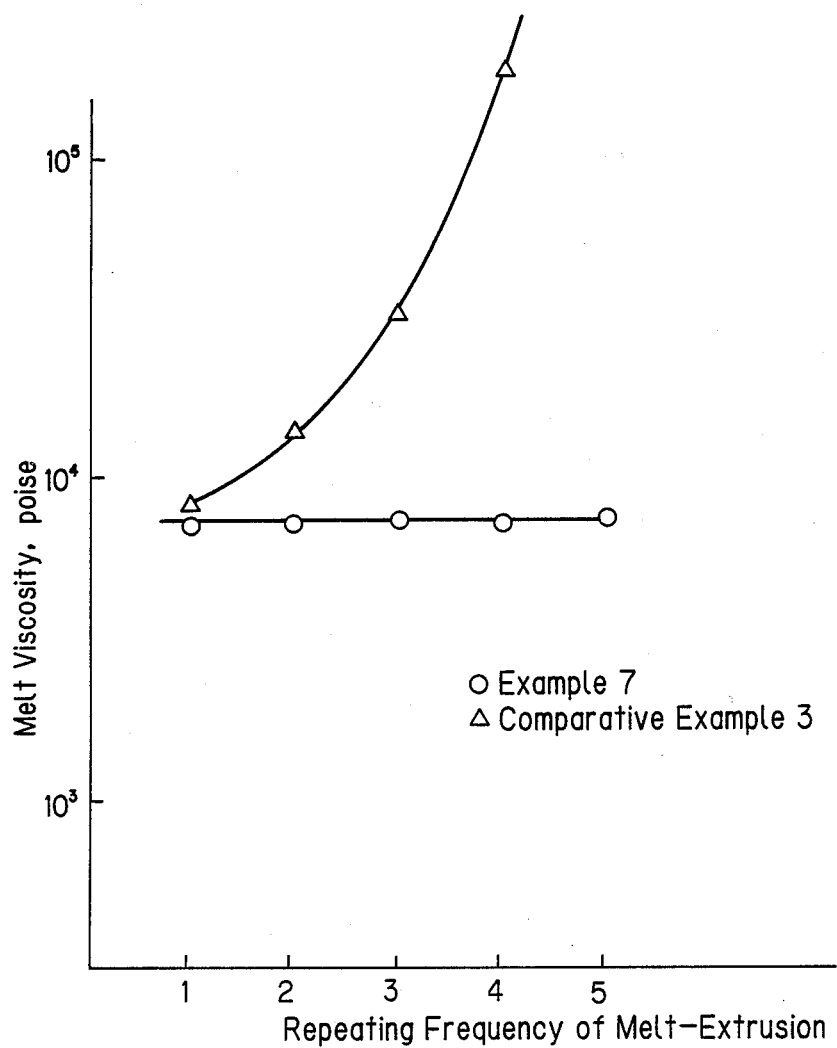

The relation between the repeating frequency of melt extrusion and the melt viscosity is shown in FIG. 4.

The melt viscosity suffers little variation even when the number of repetitions increases, revealing that the thermal stability is good.

COMPARATIVE EXAMPLE 3

The general procedure of Example 7 was repeated except that the phthalic anhydride was not reacted, thereby obtaining 774 g of a polyimide powder.

The thus obtained polyimide was subjected to repeated tests of melt viscosity by the use of the flow tester in the same manner as in Example 7, with the results shown in FIG. 4.

When the number of repetitions increased, the melt viscosity increased and thus, the thermal stability was poorer as compared with the polyimide obtained in Example 7.

EXAMPLE 8

616.7 g (1.0 mole) of bis{4-[4-(4-aminophenoxy)-phenoxy]phenyl} sulfone and 5160 g of dimethylacetamide were charged into a reactor apparatus as used in Example 7, to which 14.8 g (0.1 mole) of phthalic anhydride and 279.3 g (0.95 moles) of 3,3',4,4'-biphenyltetracarboxylic dianhydride were added at room temperature in an atmosphere of nitrogen while not allowing the temperature of the solution to increase, followed by agitation at room temperature for about 20 hours. The polyamide acid obtained had a logarithmic viscosity of 0.51 dl/g.

Subsequently, 404 g (4 moles) of triethylamine and 306 g (3 moles) of acetic anhydride were dropped into the solution. After agitation for 20 hours, there was obtained a light yellow slurry. The slurry was filtered, washed with methanol and dried at 180° C. for 8 hours under reduced pressure to obtain 849 g of a light yellow polyimide powder. The polyimide powder had a glass transition temperature of 261° C.

Figure 5:
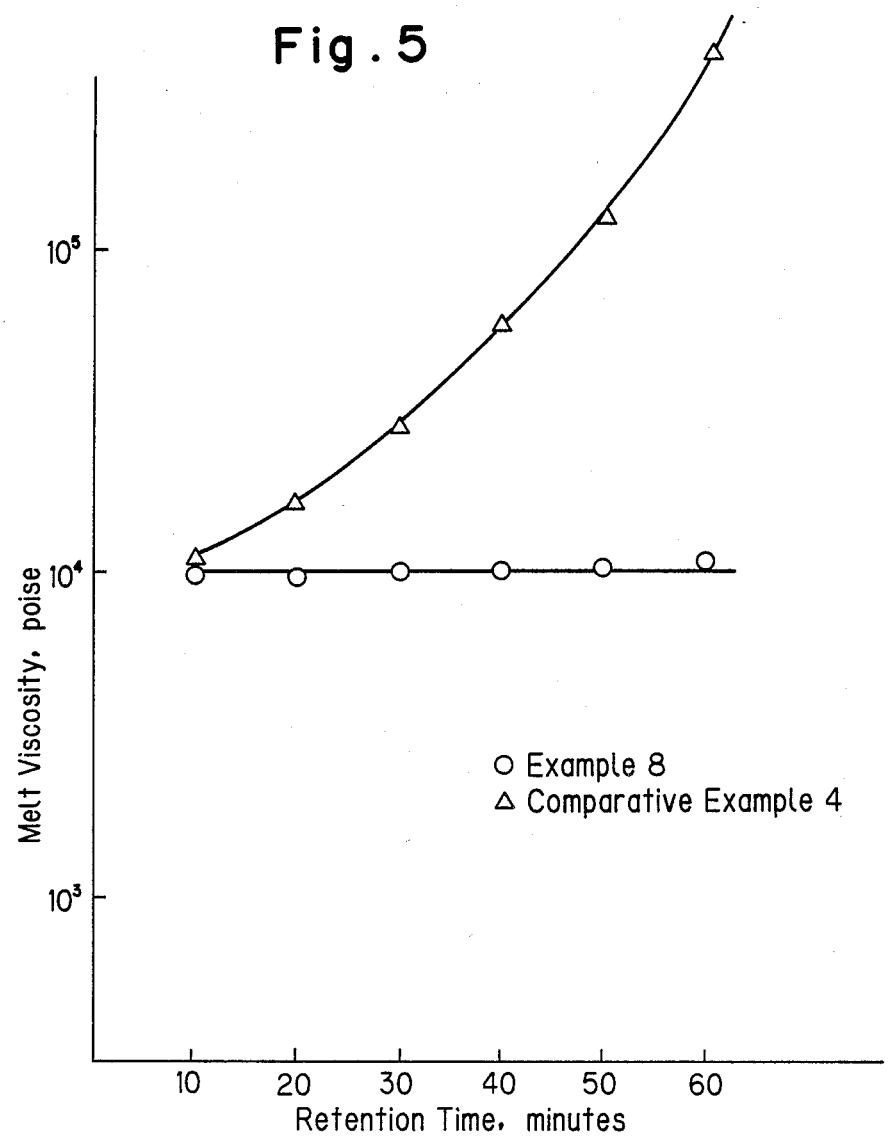

The forming stability of the polyimide obtained in this example was measured by changing the retention time in the cylinder of a flow tester. The temperature used was 380° C. and the pressure was 100 kg/cm$^2$. The results are shown in FIG. 5. The increase in the retention time in the cylinder involved little change in the melt viscosity, revealing good thermal stability.

COMPARATIVE EXAMPLE 4

In the same manner as in Example 8 without use of the phthalic anhydride, there was obtained a light yellow polyimide powder.

The polyimide powder had a glass transition temperature of 261° C. In the same manner as in Example 8, the retention time in the cylinder of the flow tester was changed to measure melt viscosity, with the result that the melt viscosity increased with an increasing retention time, thus the thermal stability being poorer when compared with the polyimide obtained in Example 8.

EXAMPLE 9

616.7 g (1.0 mole) of bis{4-[4-(4-aminophenoxy)-phenoxy]phenyl} sulfone, 294.5 g (0.95 moles) of bis(3,4-dicarboxyphenyl) ether dianhydride, 14.8 g (0.1 mole) of phthalic anhydride and 5250 g of m-cresol were charged into a reactor as used in Example 7, and heated under agitation in an atmosphere of nitrogen. After continuing the agitation at 150° C. for 3 hours, the resultant reaction product was filtered to obtain a polyimide powder.

The polyimide powder was washed for purification with methanol and acetone.

The polyimide powder had a glass transition temperature of 235° C.

Figure 6:
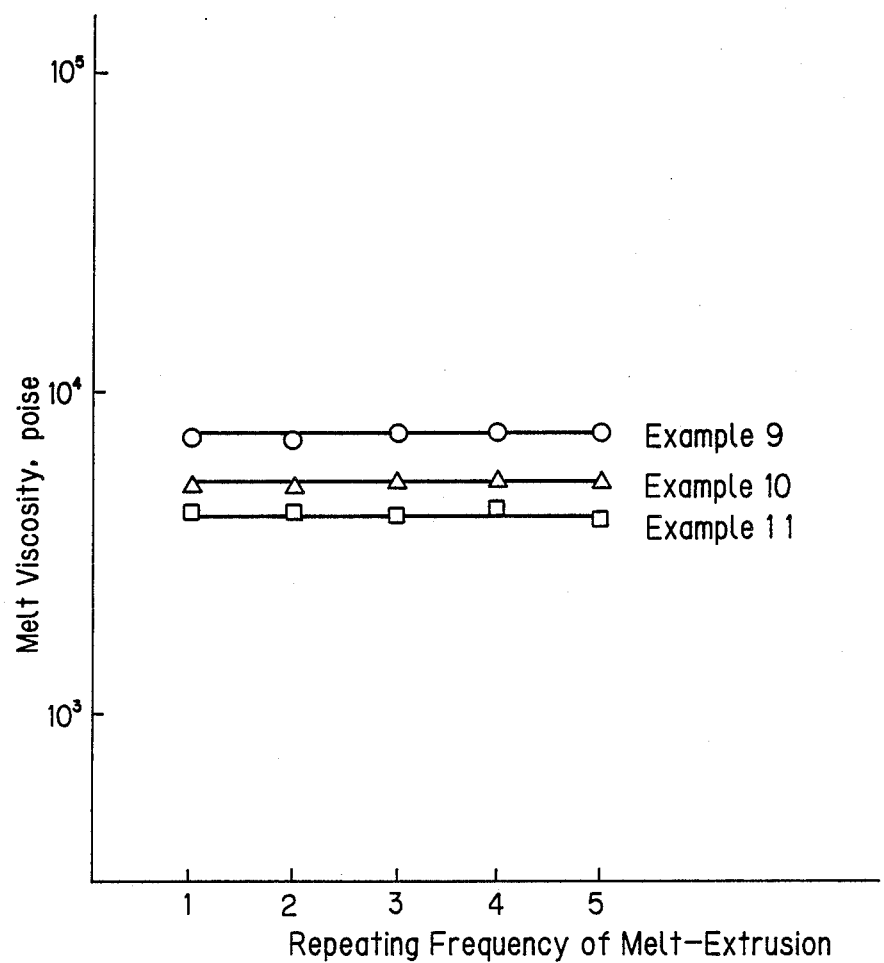

In the same manner as in Example 7, the melt viscosity was measured by repeated extrusion by the use of a flow tester at a temperature of 360° C. and a pressure of 100 kg/cm$^2$, revealing that little variation in the melt viscosity depending upon the number of repetitions of the measurement was found. The results are shown in FIG. 6.

EXAMPLES 10-11

Example 9 was repeated except that the type and amount of tetracarboxylic dianhydride and the amount of the m-cresol were changed as shown in Table 2, thereby obtaining polyimide powders.

These polyimide powders were each repeatedly subjected to extrusion with a flow tester in the same manner as in Example 9 to measure melt viscosity of the respective powders. The extrusion conditions of the flow tester and the preparatory conditions of the polymers are shown in Table 2. The results of the measurement of the melt viscosity are shown in FIG. 6 along with the results of Example 9.

TABLE 2

| | Type of Diamine, Amount (g(moles)) | Type of Tetracarboxylic dianhydride, Amount (g(moles)) | Amount of Phthalic anhydride (g(moles)) | Amount of m-Cresol (g) | Glass Transition Temperature of Polyimide (°C.) | Flow Test Conditions | | |
|---|---|---|---|---|---|---|---|---|
| | | | | | | Temp. (°C.) | Pressure (kg/cm$^2$) | Retention Time (minutes) |
| Example 10 | bis{4-[4-(4-amino-phenoxy)phenoxy]phenyl}sulfone 616.7 g (1.0 mole) | 3,3',4,4'-benzophenone-tetracarboxylic dianhydride 305 g (0.95 moles) | 14.8 g (0.1 moles) | 5310 g | 242 | 370 | 100 | 5 |
| Example 11 | bis{4-[4-(4-amino-phenoxy)phenoxy]phenyl}sulfone 616.7 g (1.0 mole) | 4,4'(p-phenylenedioxy) diphthalic dianhydride 382 g (0.95 moles) | 44.4 g (0.3 moles) | 5740 g | 219 | 340 | 100 | 5 |

EXAMPLE 12

668 g (1.0 mole) of bis{4-[4-(4-amino-α, α-dimethylbenzyl)phenoxy]phenyl} sulfone and 5 kg of N,N-dimethylacetamide were charged into a reactor equipped with an agitator, a reflux condenser and a nitrogen-introducing tube, to which 210 g (0.96 moles) of pyromellitic anhydride was added at room temperature in an atmosphere of nitrogen portion by portion while not allowing the temperature of the solution to increase, followed by agitation at room temperature for about 20 hours.

To the polyamide acid solution was added 23.7 g (0.16 moles) of phthalic anhydride at room temperature in an atmosphere of nitrogen, followed by further agitation for 1 hour. Subsequently, 202 g (2 moles) of triethylamine and 255 g (2.5 moles) of acetic anhydride were dropped into the solution. After agitation for 20 hours at room temperature, there was obtained a light yellow slurry. The slurry was filtered and washed with methanol, after which the product was removed by filtration and dried at 180° C. for 8 hours to obtain 840 g of a light yellow polyimide powder. The polyimide powder had a logarithmic viscosity of 0.55 dl/g. It will be noted that the logarithmic viscosity is a value which was determined by dissolving 0.5 g of polyimide powder in 100 ml of a solvent (p-chlorophenol:phenol =90:10 on the weight basis) under heating conditions, cooling and measuring at 35° C. The polyimide powder had a glass transition temperature of 275° C. (as measured by the DSC method) and a 5% weight loss temperature of 545° C. (as measured by the DTA-TG method).

The polyimide powder obtained in this example was subjected to repetition of measurement of melt viscosity by the use of the Koka type flow tester (CFT-500, made by Shimadzu Co., Ltd.) using an orifice with a diameter of 0.1 cm and a length of 1 cm. After heating at 370° C. for 5 minutes, the content was extruded at a pressure of 100 kg/cm$^2$. The resultant strand was broken into pieces, followed by successive extrusion five times in total under the same conditions as set forth above.

Figure 7:
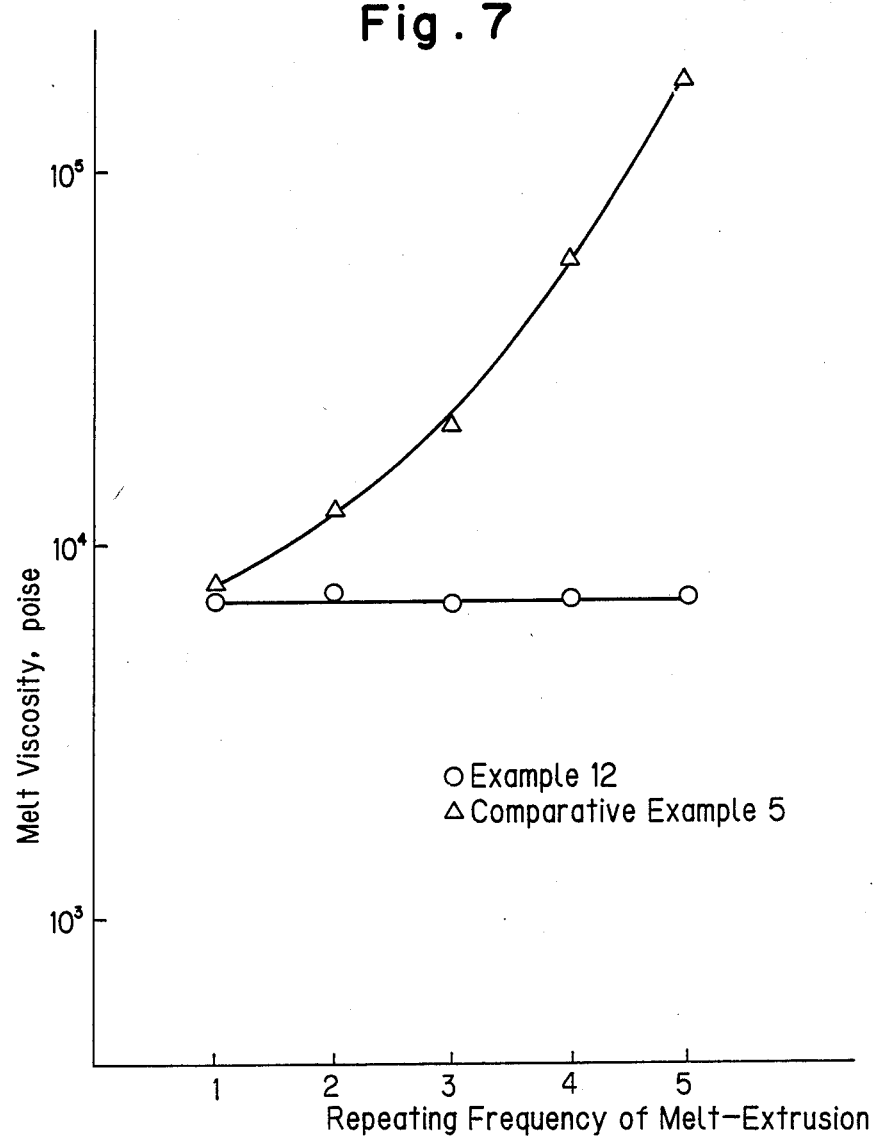

The relation between the repeating frequency of melt extrusion and the melt viscosity is shown in FIG. 7.

The melt viscosity suffers little variation even when the number of repetitions increases, revealing the thermal stability is good.

COMPARATIVE EXAMPLE 5

Example 12 was repeated except that the phthalic anhydride was not reacted, thereby obtaining 830 g of a polyimide powder.

The thus obtained polyimide had a logarithmic viscosity of 0.55 dl/g. The polyimide powder was subjected to a repeating test of melt viscosity by the use of the flow tester in the same manner as in Example 12, with the results shown in FIG. 7.

When the repeating frequency increased, the melt viscosity increased and thus, the thermal stability was poorer as compared with the polyimide obtained in Example 12.

EXAMPLE 13

632 g (1.0 mole) of 4,4'-bis-[4-(4amino-α, α-dimethylbenzyl)phenoxy] benzophenone was and 4840 g of N,N-dimethylacetamide charged into a reactor apparatus as used in Example 12, to which 11.85 g (0.08 moles) of phthalic anhydride and 210 g (0.96 moles) of pyromellitic dianhydride were added at room temperature in an atmosphere of nitrogen while not allowing the temperature of the solution to increase, followed by agitation at room temperature for about 20 hours.

Thereafter, 202 g (2 moles) of triethylamine and 255 g (2.5 moles) of acetic anhydride were dropped into the solution. After agitation for further 20 hours, there was obtained a light yellow slurry. The slurry was filtered, washed with methanol and dried at 180° C. for 8 hours under reduced pressure to obtain 785 g of a light yellow polyimide powder. The polyimide powder had a glass transition temperature of 235° C. and a logarithmic viscosity of 0.58 dl/g.

Figure 8:
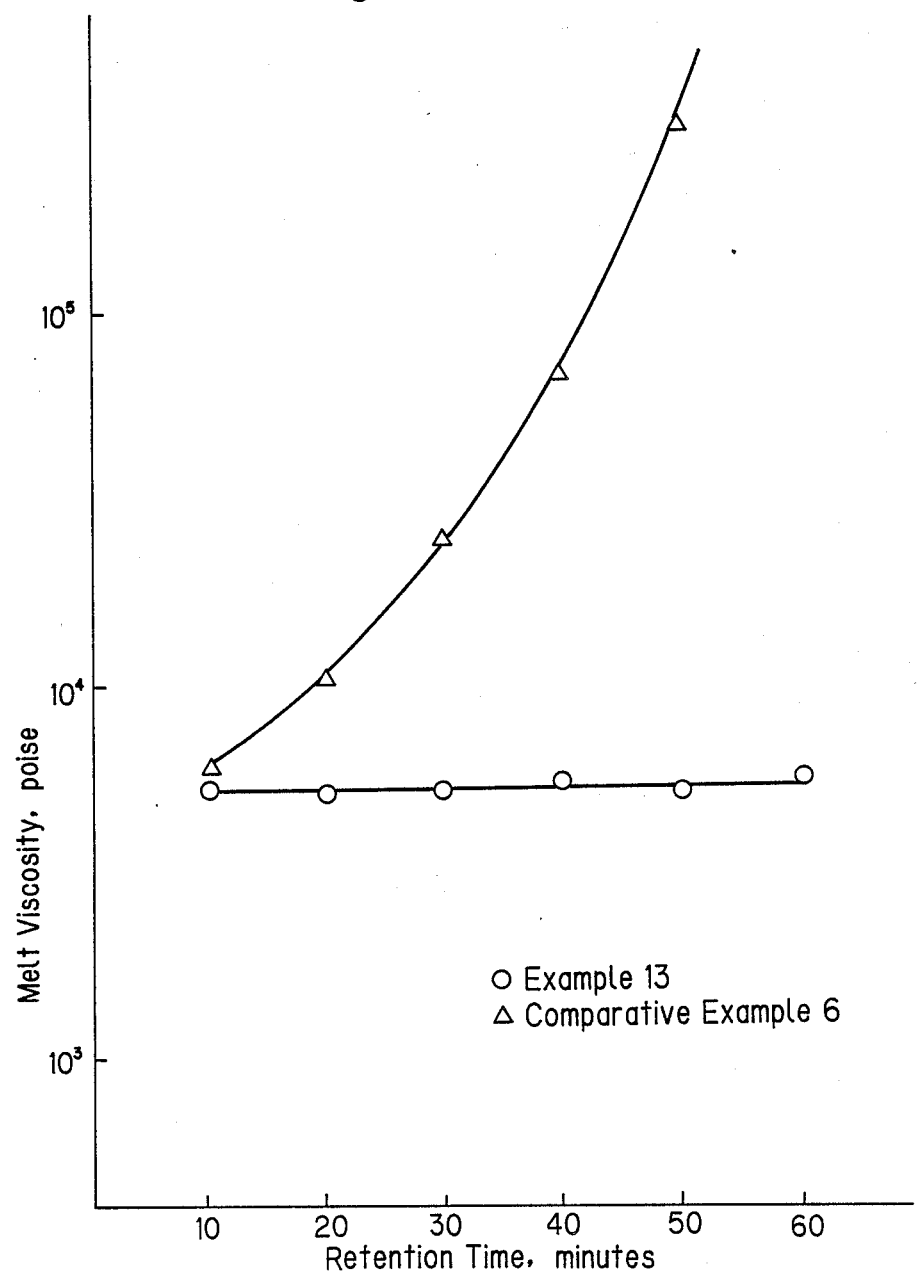

The forming stability of the polyimide obtained in this example was measured by changing the retention time in the cylinder of a flow tester. The temperature used was 340° C. and the pressure was 100 kg/cm$^2$. The results are shown in FIG. 8. The increase in the retention time in the cylinder involved little change in the melt viscosity, revealing good thermal stability.

COMPARATIVE EXAMPLE 6

In the same manner as in Example 13 without use of the phthalic anhydride, there was obtained a light yellow polyimide powder.

The polyimide powder had a glass transition temperature of 235° C. and a logarithmic viscosity of 0.58 dl/g. In the same manner as in Example 13, the retention time in the cylinder of the flow tester was changed to measure melt viscosity, with the result that the melt viscosity increased with an increasing retention time, thus the thermal stability being poorer when compared with the polyimide obtained in Example 13.

EXAMPLE 14

668 g (1.0 mole) of bis{4-[4-(4-amino-α, α-dimethylbenzyl)phenoxy]phenyl} sulfone, 300.7 g (0.97 moles) of bis(3,4-dicarboxyphenyl) ether dianhydride, 8.88 g (0.06 moles) of phthalic anhydride and 5500 g of m-cresol were charged into a reactor as used in Example 12, and heated under agitation in an atmosphere of nitrogen. After heating to 150° C., the agitation was continued for 2 hours and the resultant reaction product was discharged into methanol and filtered to obtain a polyimide powder.

The polyimide powder was washed with methanol and acetone and dried at 180° C. for 8 hours under reduced pressure to obtain 895 g of a polyimide powder.

The polyimide powder had a logarithmic viscosity of 0.61 dl/g and a glass transition temperature of 220° C.

Figure 9:
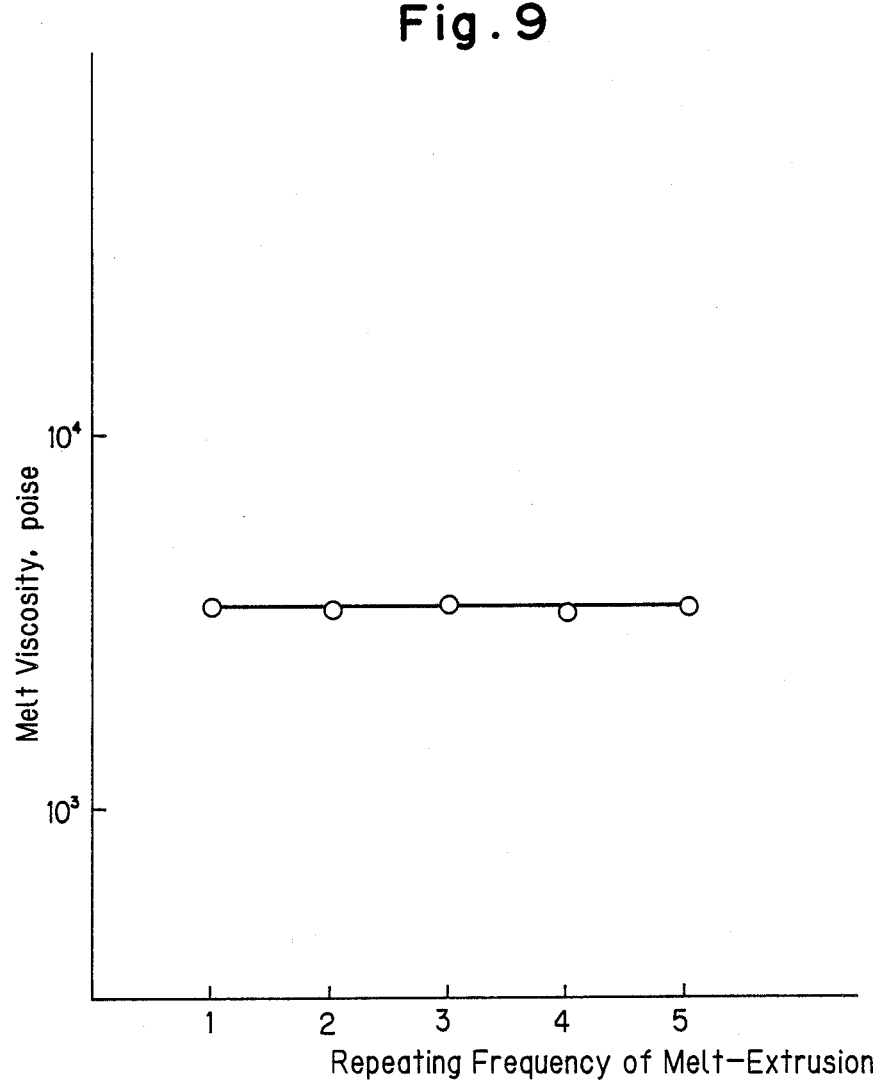

In the same manner as in Example 12, the melt viscosity was measured by repeated extrusion by the use of a flow tester at a temperature of 340° C. and a pressure of 100 kg/cm$^2$, revealing that little variation in the melt viscosity depending upon the number of repetitions of the measurement was found. The results are shown in FIG. 9.

EXAMPLE 15

500 g (1.0 mole) of 1,3-bis[4-(3-aminophenoxy)benzoyl]benzene and 4130 g of N,N-dimethylacetamide were charged into a reactor apparatus equipped with an agitator, a reflux condenser and a nitrogen-introducing tube, to which 208.2 g (0.955 moles) of pyromellitic anhydride was added at room temperature in an atmosphere of nitrogen portion by portion while not allowing the temperature of the solution to elevate, followed by agitation at room temperature for about 20 hours. To the polyimide acid solution was added 20 g (0.135 moles) of phthalic anhydride at room temperature in an atmosphere of nitrogen, followed by further agitation for 1 hour.

Thereafter, 404 g (4 moles) of triethylamine and 306 g (3 moles) of acetic anhydride were dropped into the solution. After agitation for further 20 hours, there was obtained a light yellow slurry. The slurry was filtered, dispersed in and washed with methanol, filtered and dried at 180° C. for 2 hours to obtain 657 g of a polyimide powder. The polyimide powder had a glass transition temperature of 235° C. The polyimide powder had a logarithmic viscosity of 0.53 dl/g. The logarithmic viscosity is a value which was measured at 35° C. using a mixed solvent of parachlorophenol:phenol (90:10 on the weight basis) and a concentration of 0.5 g/100 ml of the solvent.

The forming stability of the polyimide obtained in this example was measured by changing the retention time in the cylinder of a flow tester. The temperature used was 330° C. and the pressure was 100 kg/cm$^2$. The resultant strand was broken into pieces and extruded five times in total under the same conditions.

Figure 10:
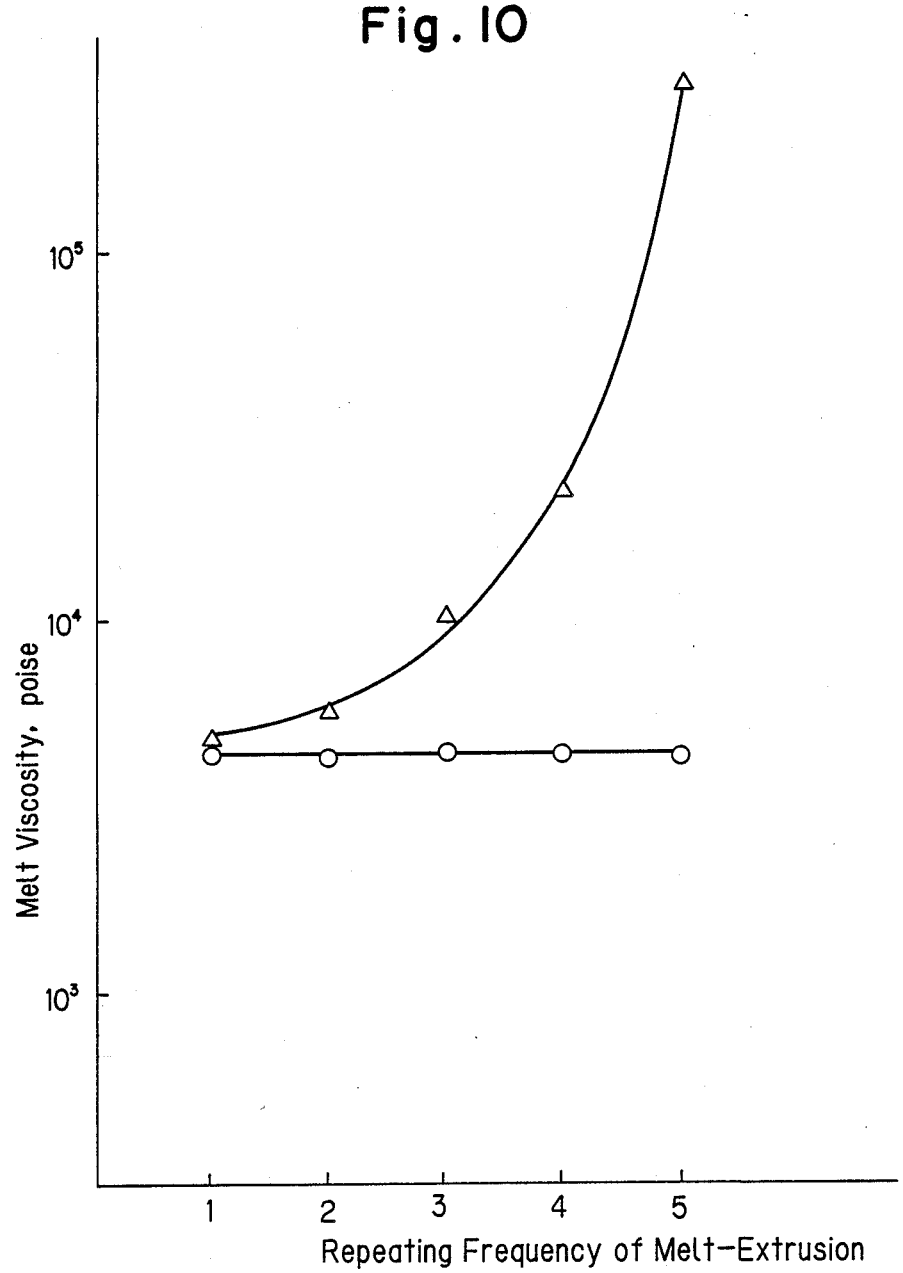

The relation between the repeating frequency and the melt viscosity is shown by line -- in FIG. 10. The increase in the number of repetitions involved little variation in the melt viscosity, revealing good thermal stability.

COMPARATIVE EXAMPLE 7

In the same manner as in Example 15 without use of the phthalic anhydride, there was obtained 640 g of a polyimide powder.

The polyimide powder had a logarithmic viscosity of 0.53 dl/g. In the same manner as in Example 15, the melt viscosity was repeatedly tested with the results shown by line -Δ-Δ in FIG. 10.

The melt viscosity increased with an increasing melt viscosity, thus the thermal stability being poorer when compared with the polyimide obtained in Example 15.

EXAMPLE 16

500 g (1.0 mole) of 1,4-bis[4-(3-aminophenoxy)benzoyl] benzene and 4500 g of dimethylacetamide were charged into a reactor apparatus as used in Example 15, to which 14.8 g (0.1 mole) of phthalic anhydride and 280 g (0.95 moles) of 3,3',4,4'-biphenyltetracarboxylic dianhydride were added at room temperature in an atmosphere of nitrogen while not allowing the temperature of the solution to increase, followed by agitation at room temperature for about 20 hours.

Thereafter, 404 g (4 moles) of triethylamine and 306 g (3 moles) of acetic anhydride were dropped into the solution. After agitation for 20 hours, there was obtained a light yellow slurry. The slurry was filtered, washed with methanol and dried at 180° C. for 8 hours under reduced pressure to obtain 728 g of a light yellow polyimide powder. The polyimide powder had a glass transition temperature of 225° C. and a logarithmic viscosity of 0.52 dl/g.

Figure 11:
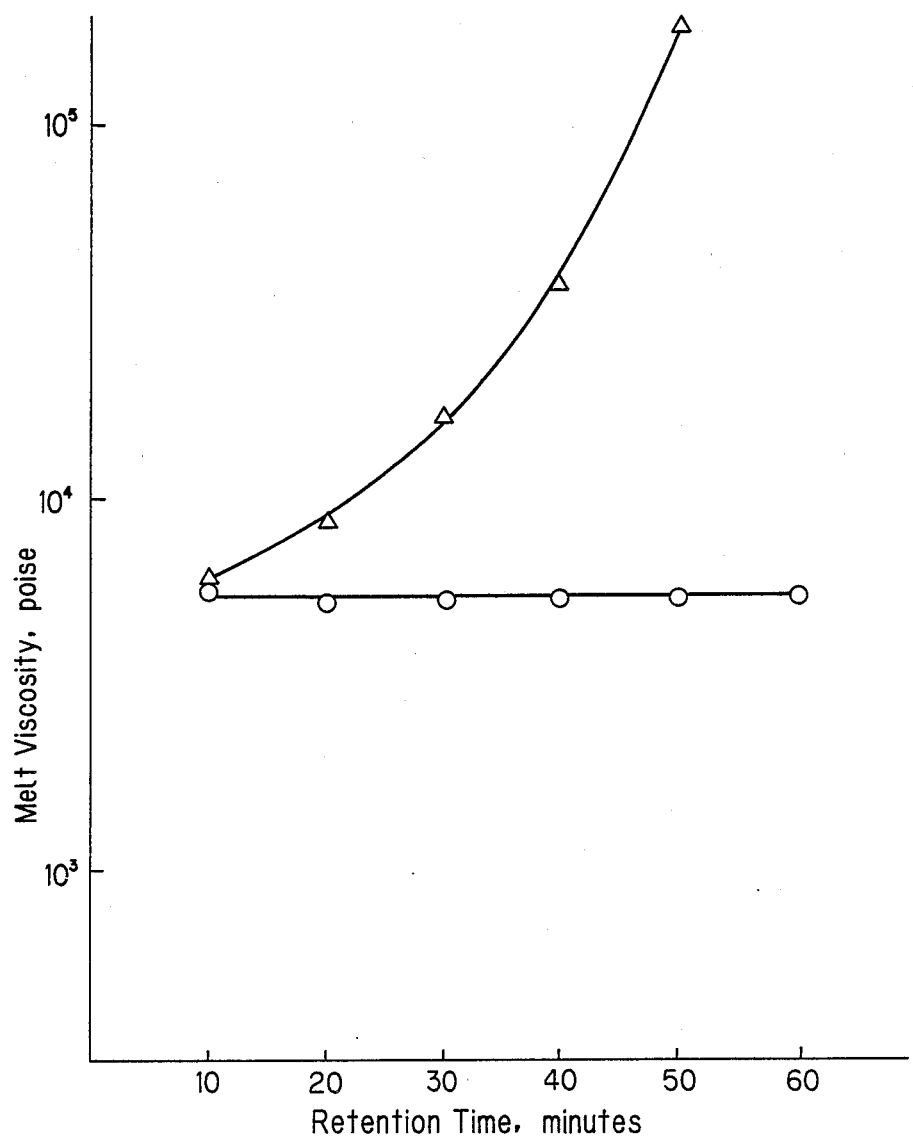

The forming stability of the polyimide obtained in this example was measured by changing the retention time in the cylinder of a flow tester. The temperature used was 330° C. and the pressure was 100 kg/cm$^2$. The results are shown in line -- in FIG. 11. The increase in the retention time in the cylinder involved little change in the melt viscosity, revealing good thermal stability.

COMPARATIVE EXAMPLE 8

In the same manner as in Example 16 without use of the phthalic anhydride, there was obtained a light yellow polyimide powder.

The polyimide powder had a glass transition temperature of 225° C. and a logarithmic viscosity of 0.52 dl/g. In the same manner as in Example 16, the retention time as illustrated by line -Δ-Δ in the cylinder of the flow tester was changed to measure melt viscosity, with the result that the melt viscosity increased with an increasing retention time, thus the thermal stability being poorer when compared with the polyimide obtained in Example 16.

EXAMPLE 17

475 9 (0.95 moles) of 1,3-bis[4-(3-aminophenoxy)-benzoyl] benzene, 10.1 g (0.05 moles) of bis(4-aminophenyl) ether, 305 g (0.925 moles) of 3,3',4,4'-benzophenonetetracarboxylic dianhydride, 14.8 g (0.1 mole) of phthalic anhydride and 4560 g of m-cresol were charged into a reactor as used in Example 15, and heated under agitation in an atmosphere of nitrogen. After heating to 150° C. and continuing the agitation for 4 hours, the resultant reaction product was cooled, discharged into methanol and filtered to obtain a polyimide powder.

The polyimide powder was washed with methanol and acetone, after which it was dried at 180° C. for 8 hours under reduced pressure to obtain 734 g of a polyimide powder.

The polyimide powder had a logarithmic viscosity of 0.51 dl/g and glass transition temperature of 220° C.

Figure 12:
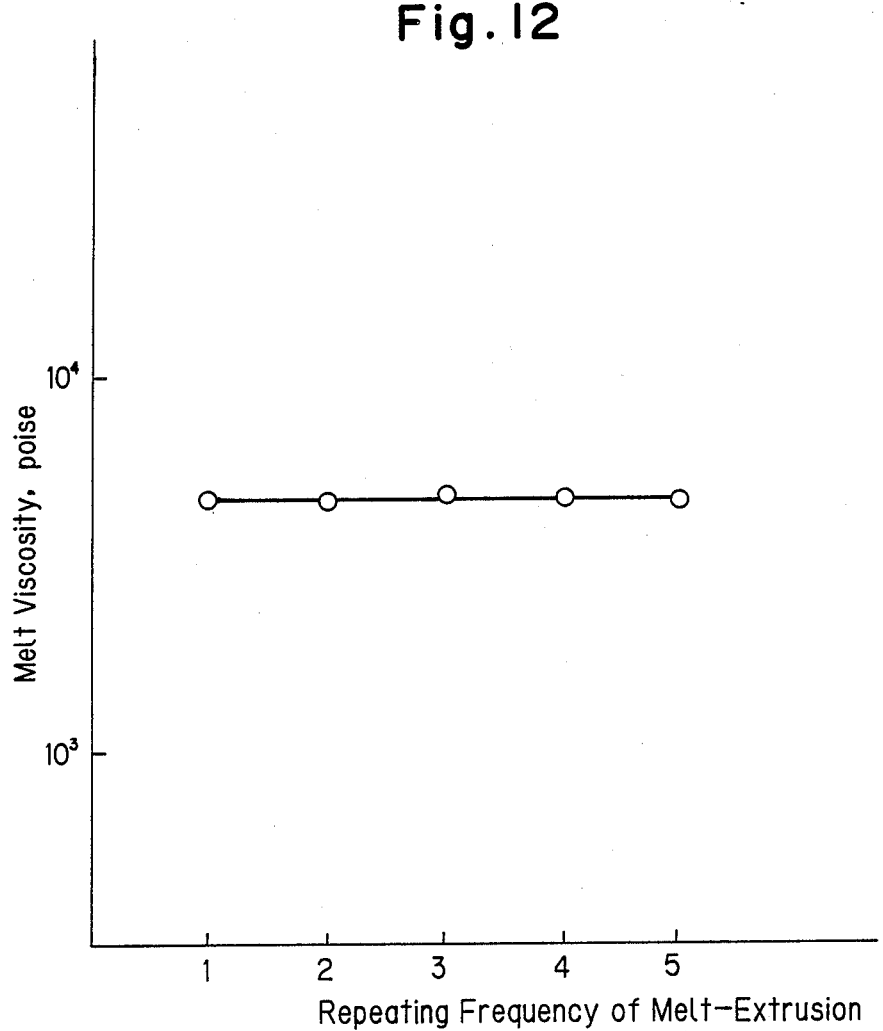

In the same manner as in Example 15, the melt viscosity was measured by repeating extrusion by the use of a flow tester at a temperature of 310° C. and a pressure of 100 kg/cm$^2$, revealing that little variation in the melt viscosity depending upon the number of repetitions of the measurement was found. The results are shown in FIG. 12.

EXAMPLE 18

592 g (1.0 mole) of bis{4-[3-(4-aminophenoxy)benzoyl]phenyl} ether and 4700 g of N,N-dimethylacetamide were charged into a reactor equipped with an agitator, a reflux condenser and a nitrogen-introducing tube, to which 207 g (0.95 moles) of pyromellitic anhydride was added at room temperature in an atmosphere of nitrogen portion by portion while not allowing the temperature of the solution to increase, followed by agitation at room temperature for about 20 hours. To the polyamide acid solution was added 17.6 g (0.155 moles) of glutaric anhydride at room temperature in an atmosphere of nitrogen, followed by further agitation for 1 hour. Subsequently, 202 g (2 moles) of triethylamine and 306 g (3 moles) of acetic anhydride were dropped into the solution. After agitation for 20 hours at room temperature, the reaction product was discharged into methanol and filtered, followed by dispersion in and washing with methanol, filtration and drying at 180° C. for 2 hours to obtain 742 g of a polyimide powder.

The polyimide powder had a glass transition temperature of 227° C. and a melting point of 385° C. (as determined by DSC). The polyimide powder had a logarithmic viscosity of 0.55 dl/g. It will be noted that the logarithmic viscosity is a value which was determined by using a mixed solvent of parachlorophenol:phenol (90:10 on the weight basis) and a concentration of 0.5 g/100 ml of the solvent. The polyimide powder obtained in this example was subjected to measurement of the relation between the melt viscosity and the pressure (shearing speed) by the use of the Koka type flow tester (CFT-500, made by Shimadzu Co., Ltd., with an orifice diameter of 0.1 cm and a length of 1 cm).

Figure 13:
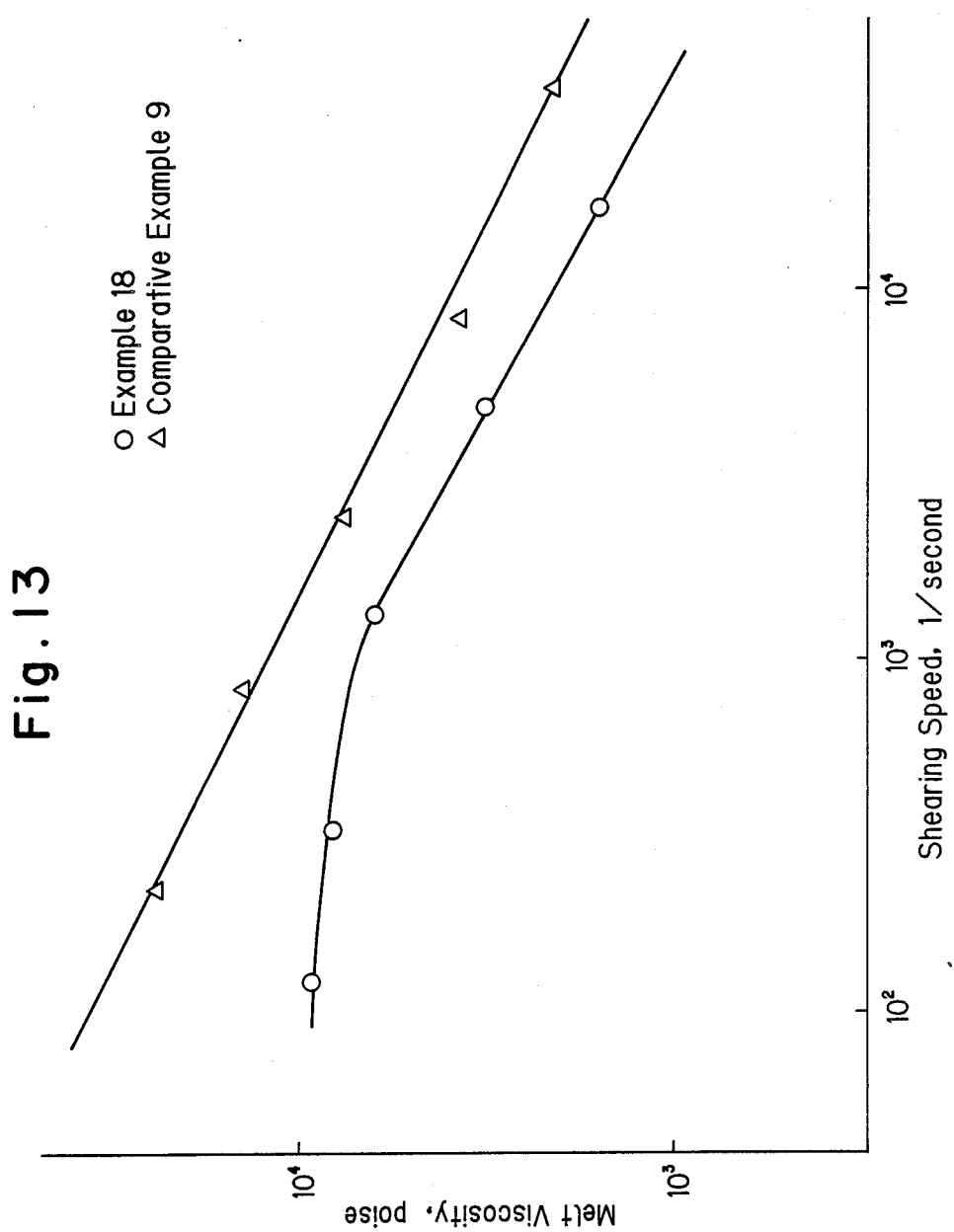

FIG. 13 shows the relation between the melt viscosity and the shearing speed wherein the melt viscosity was measured by changing the shearing speed after keeping at a temperature of 410° C. for 5 minutes.

COMPARATIVE EXAMPLE 9

Example 18 was repeated except that the glutaric anhydride was not reacted, thereby obtaining 730 g of a polyimide powder.

The thus obtained polyimide had a logarithmic viscosity of 0.55 dl/g.

The polyimide powder was subjected to measurement of the relation between the melt viscosity and the shearing speed by the use of a flow tester in the same manner as in Example 18. The results are shown in FIG. 13.

EXAMPLE 19

592 g (1.0 mol) of bis{4-[3-(4-aminophenoxy)benzoyl]phenyl} ether and 4700 g of dimethylacetamide were charged into a reactor apparatus as used in Example 18, to which 15.4 g (0.1 mole) of 1,2-cyclohexanedicarboxylic anhydride and 304.8 g (0.95 moles) of 3,3',4,4'-benzophenonetetracarboxylic dianhydride were added at room temperature in an atmosphere of nitrogen while not allowing the temperature of the solution to elevate, followed by agitation at room temperature for about 20 hours.

Thereafter, 202 g (2 moles) of triethylamine and 306 g (3 moles) of acetic anhydride were dropped into the solution.

After agitation for further 20 hours, the resultant reaction product was discharged into methanol and filtered, washed with methanol and dried at 180° C. for 8 hours under reduced pressure to obtain 832 g of a light yellow polyimide powder. The polyimide powder had a glass transition temperature of 198° C. and a logarithmic viscosity of 0.53 dl/g.

Figure 14:
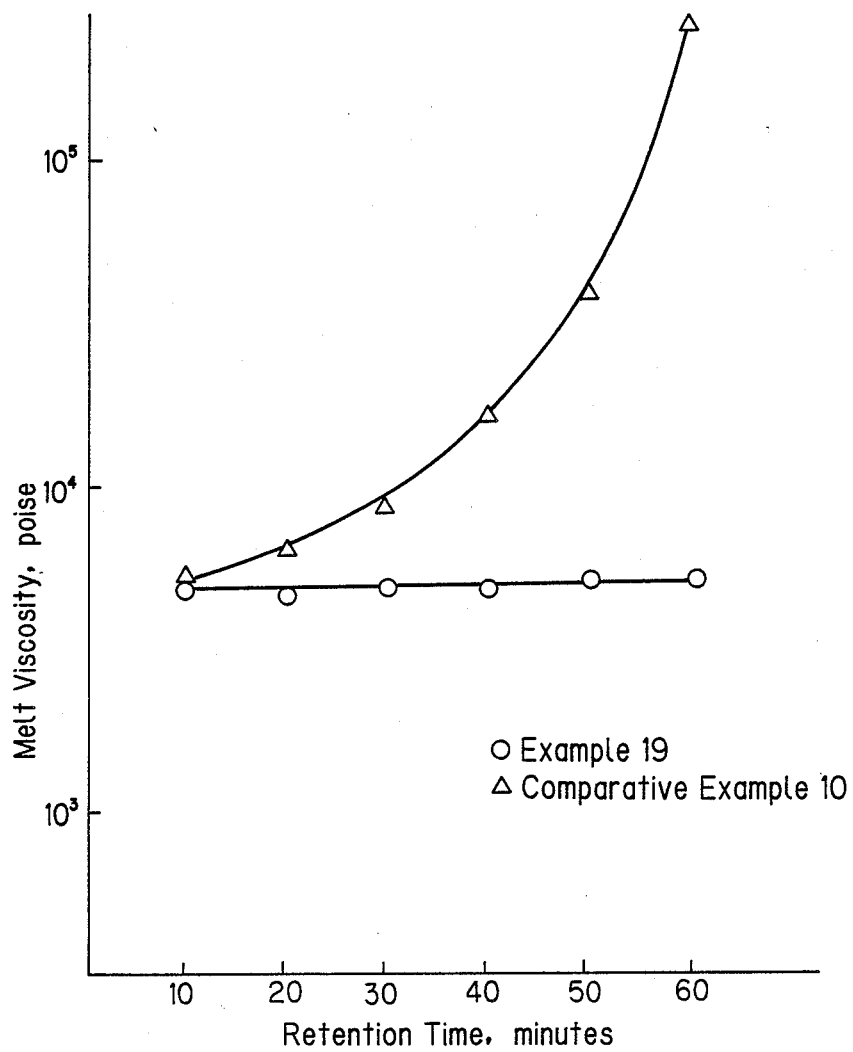

The forming stability of the polyimide obtained in this example was measured by changing a retention time in the cylinder of a flow tester. The temperature used was 320° C. and the pressure was 100 kg/cm². The results are shown in FIG. 14. The increase in the retention time in the cylinder involved little change in the melt viscosity, revealing good thermal stability.

COMPARATIVE EXAMPLE 10

In the same manner as in Example 19 without use of the 1,2-cyclohexanecarboxylic anhydride, there was obtained a light yellow polyimide powder.

The polyimide powder had a glass transition temperature of 198° C. and a logarithmic viscosity of 0.53 dl/g. In the same manner as in Example 19, the retention time in the cylinder of the flow tester was changed to measure melt viscosity, with the result that the melt viscosity increased with an increasing retention time, thus the thermal stability being poorer when compared with the polyimide obtained in Example 19.

EXAMPLE 20

592 g (1.0 mole) of bis{4-[4-(4-aminophenoxy)benzoyl]phenyl} ether, 297.6 g (0.96 moles) of bis(3,4-dicarboxyphenyl) ether dianhydride, 8.96 g (0.08 moles) of citraconic anhydride and 5100 g of m-cresol were charged into a reactor as used in Example 12, and heated under agitation in an atmosphere of nitrogen. After heating to 150° C., the agitation was continued for 4 hours and the resultant reaction product was cooled, discharged into methanol and filtered to obtain a polyimide powder.

The polyimide powder was washed with methanol and acetone and dried at 180° C. for 8 hours under reduced pressure to obtain 823 g of a polyimide powder.

The polyimide powder had a logarithmic viscosity of 0.57 dl/g and a glass transition temperature of 189° C.

Figure 15:
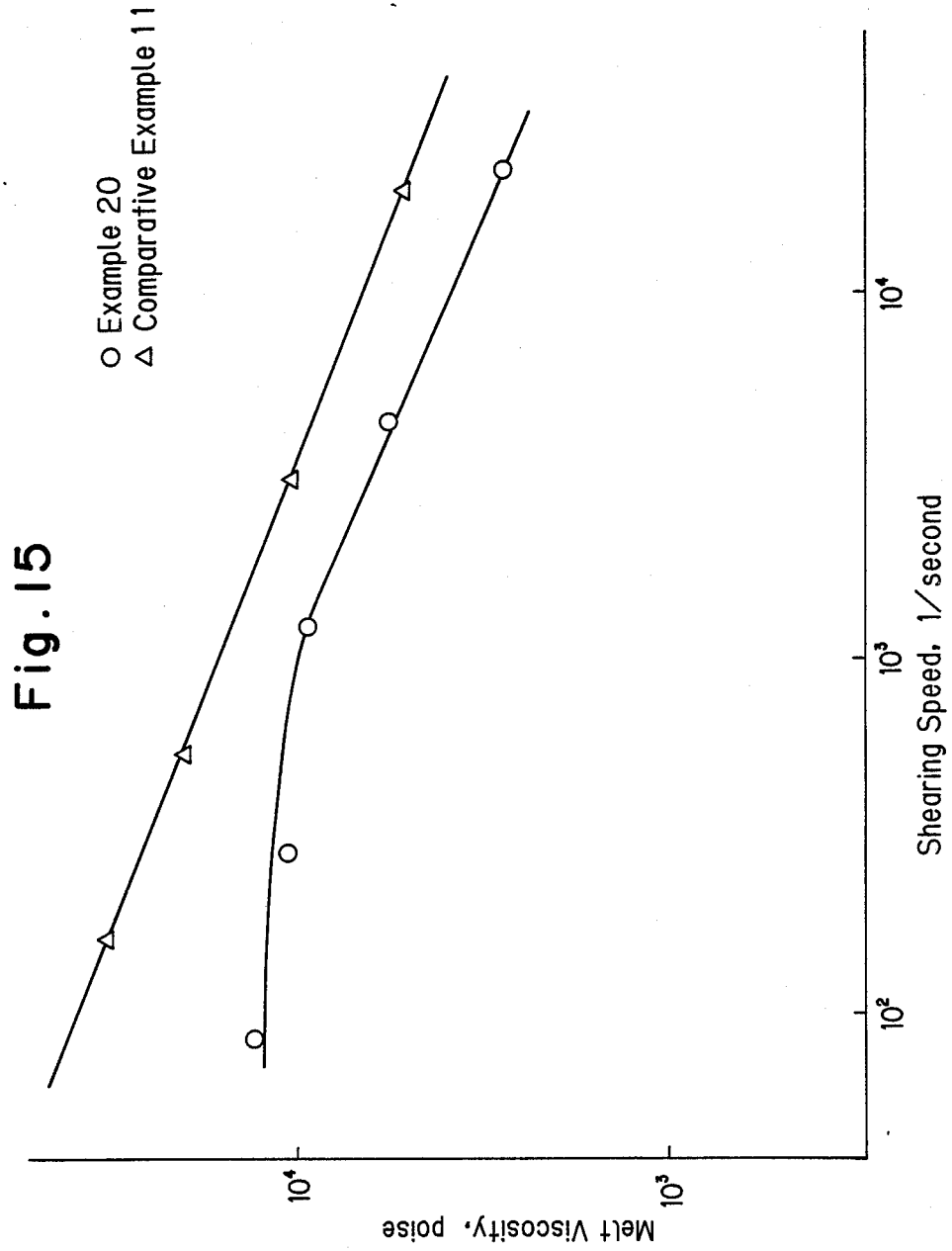

The measurement as carried out in Example 18 was made at a temperature of 300° C., with the results shown in FIG. 15.

COMPARATIVE EXAMPLE 11

Example 20 was repeated without use of the citraconic anhydride, thereby obtaining a polyimide powder having a logarithmic viscosity of 0.57 dl/g.

The measurement as in Example 18 was made at a temperature of 300° C., with the results shown in FIG. 15.

EXAMPLE 21

500 g (1.0 mole) of 1,3-bis[4-(3-aminophenoxy)benzoyl] benzene and 4130 g of N,N-dimethylacetamide were charged into a reactor equipped with an agitator, a reflux condenser and a nitrogen-introducing tube, to which 208.2 g (0.955 moles) of pyromellitic anhydride was added at room temperature in an atmosphere of nitrogen portion by portion while not allowing the temperature of the solution to increase, followed by agitation at room temperature for about 20 hours.

To the polyamide acid solution was added 15.3 g (0.135 moles) of glutaric anhydride at room temperature in an atmosphere of nitrogen, followed by further agitation for 1 hour. Subsequently, 202 g (2 moles) of triethylamine and 306 g (3 moles) of acetic anhydride were dropped into the solution. After agitation for 10 hours at room temperature, there was obtained a light yellow slurry. The slurry was subjected to filtration, and the resultant reaction product was dispersed in and washed with methanol and filtered, and dried at 180° C. for 2 hours to obtain 653 g of a polyimide powder. The polyimide powder had a glass transition temperature of 235° C. The polyimide powder had a logarithmic viscosity of 0.55 dl/g. It will be noted that the logarithmic viscosity is a value which was determined at 35° C. by using a mixed solvent of parachlorophenol:phenol (90:10 on the weight basis) and a concentration of 0.5 g/100 ml of the solvent.

Figure 16:
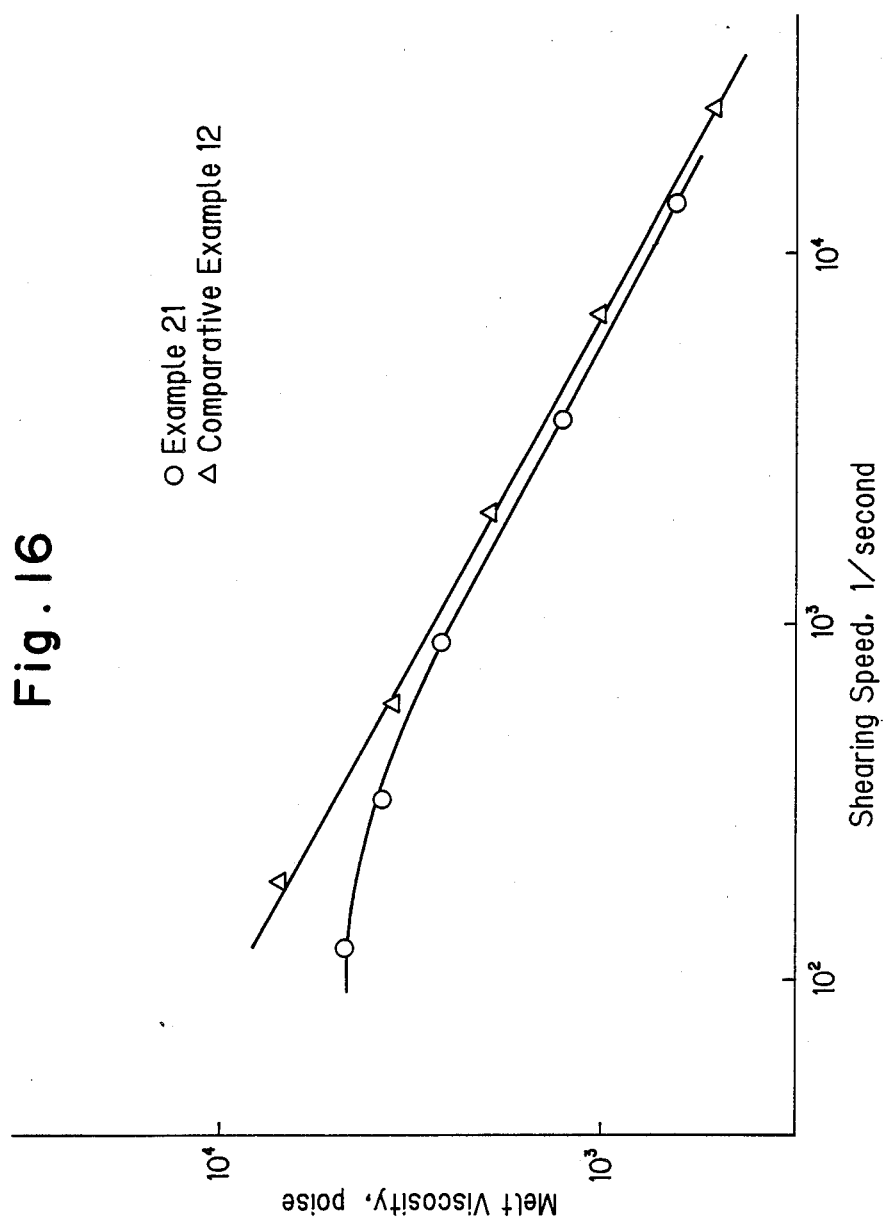

The polyimide powder obtained in this example was subjected to measurement of the relation between the melt viscosity and the pressure (shearing speed) by the use of the Koka type flow tester (CFT-500, made by Shimadzu Co., Ltd., with an orifice diameter of 0.1 cm and a length of 1 cm). FIG. 16 shows the relation between the melt viscosity and the shearing speed wherein the melt viscosity was measured by changing the shearing speed after heating at a temperature of 330° C. for 5 minutes.

COMPARATIVE EXAMPLE 12

Example 21 was repeated except that the glutaric anhydride was not reacted, thereby obtaining 640 g of a polyimide powder.

The thus obtained polyimide had a logarithmic viscosity of 0.53 dl/g.

The polyimide powder was subjected to measurement of the relation between the melt viscosity and the shearing speed by the use of a flow tester in the same manner as in Example 21. The results are shown in FIG. 16.

EXAMPLE 22

500 g (1.0 mole) of 1,4-bis[4-(3-aminophenoxy)benzoyl] benzene and 4500 g of dimethylacetamide were charged into a reactor apparatus as used in Example 21, to which 15.4 g (0.1 mole) of 1,2-cyclohexanedicarboxylic anhydride and 280 g (0.95 moles) of 3,3',4,4'-biphenyltetracarboxylic dianhydride were added at room temperature in an atmosphere of nitrogen while not allowing the temperature of the solution to increase, followed by agitation at room temperature for about 20 hours.

Thereafter, 202 g (2 moles) of triethylamine and 306 g (3 moles) of acetic anhydride were dropped into the solution. After agitation for further 20 hours, there was obtained a light yellow slurry. The slurry was filtered and the reaction product was washed with methanol, and dried at 180° C. for 8 hours under reduced pressure to obtain 728 g of a light yellow polyimide powder. The polyimide powder had a glass transition temperature of 225° C. and a logarithmic viscosity of 0.52 dl/g.

Figure 17:
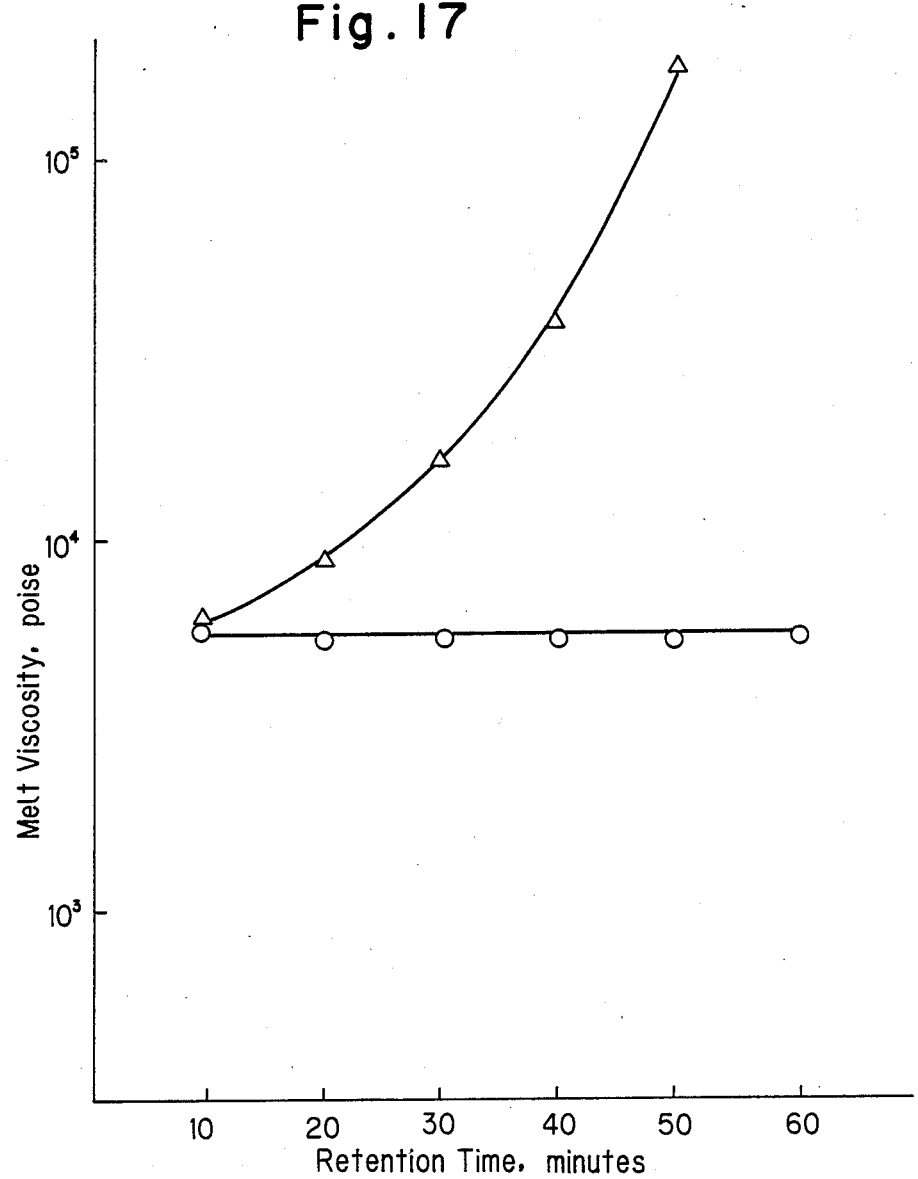

The forming stability of the polyimide obtained in this example was measured by changing the retention time in the cylinder of a flow tester. The temperature used was 330° C. and the pressure was 100 kg/cm². The results are shown by line -- in FIG. 17. The increase in the retention time in the cylinder involved little change in the melt viscosity, revealing good thermal stability.

COMPARATIVE EXAMPLE 13

In the same manner as in Example 22 without use of the 1,2-cyclohexanecarboxylic anhydride, there was obtained a light yellow polyimide powder.

The polyimide powder had a glass transition temperature of 225° C. and a logarithmic viscosity of 0.52 dl/g. In the same manner as in Example 22, the retention time In the cylinder of the flow tester was changed to measure melt viscosity, with the result that the melt viscosity increased with an increasing retention time as illustrated by line -Δ-Δ, thus the thermal stability being poorer when compared with the polyimide obtained in Example 22.

EXAMPLE 23

475 g (0.95 moles) of 1,3-bis[4-(3-aminophenoxy) benzoyl] benzene, 10.1 g (0.05 moles) of bis(4-aminophenyl) ether, 305 g (0.952 moles) of 3,3',4,4'-benzophenonetetracarboxylic dianhydride, 11.2 g (0.1 mole) of citraconic anhydride and 4560 g of m-cresol were charged into a reactor as used in Example 21, and heated under agitation in an atmosphere of nitrogen. After heating to 150° C. and continuing the agitation for 4 hours, the resultant reaction product was cooled, discharged into methanol and filtered to obtain a polyimide powder.

The polyimide powder was washed with methanol and acetone, after which it was dried at 180° C. for 8 hours under reduced pressure to obtain 732 g of a polyimide powder.

The polyimide powder had a logarithmic viscosity of 0.51 dl/g and glass transition temperature of 220° C.

Figure 18:
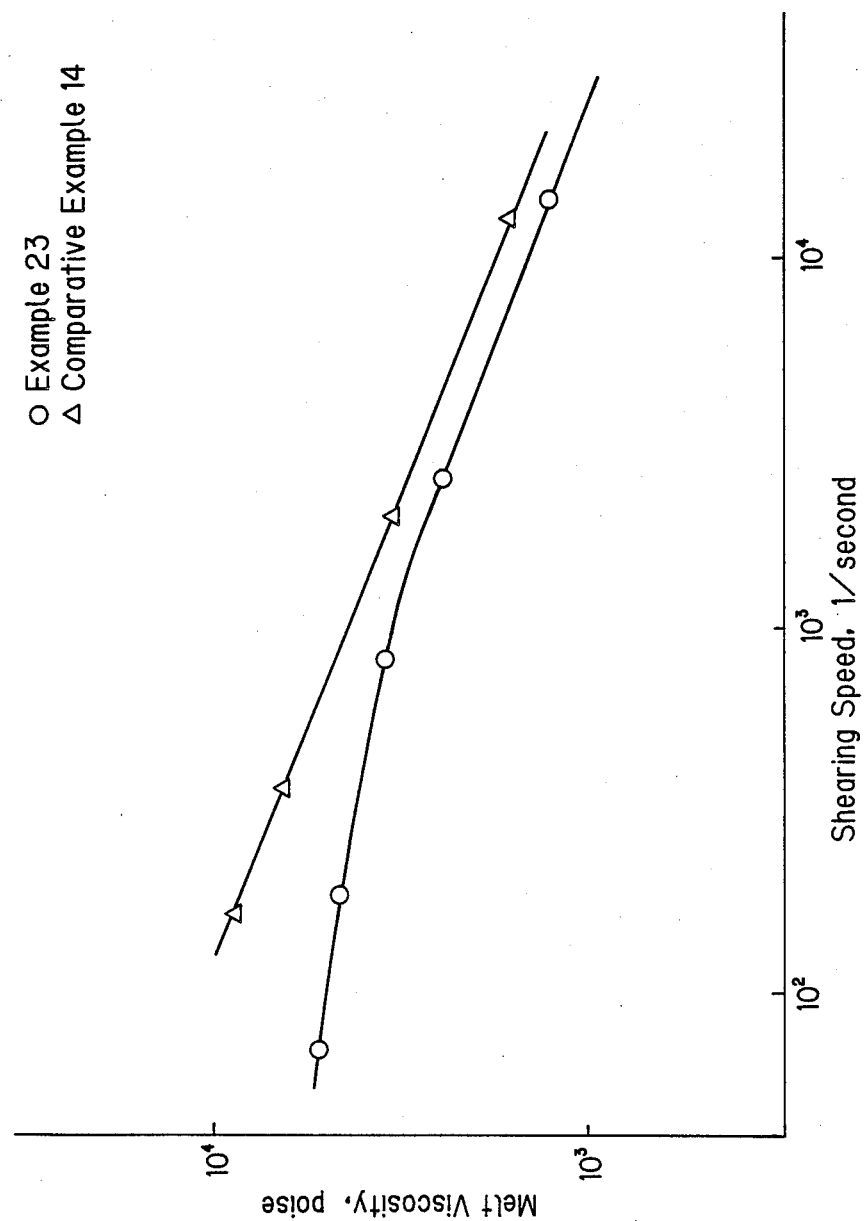

The measurement as in Example 21 was made at a temperature of 310° C., with the results shown in FIG. 18.

COMPARATIVE EXAMPLE 14

Example 23 was repeated without use of the citraconic anhydride, thereby obtaining a polyimide powder having a logarithmic viscosity of 0.50 dl/g.

The measurement as in Example 21 was made at a temperature of 310° C. The results are shown in FIG. 18.

EXAMPLE 24

668 g (1.0 mole) of bis{4-[4-(4-amino-α, α-dimethylbenzyl)phenoxy]phenyl} sulfone and 5 kg of N,N-dimethylacetamide were charged into a reactor equipped with an agitator, a reflux condenser and a nitrogen introducing tube, to which 210 g (0.96 moles) of pyromellitic anhydride was added at room temperature in an atmosphere of nitrogen portion by portion while not allowing the temperature of the solution to increase, followed by agitation at room temperature for about 20 hours.

To the polyamide acid solution was added 18.2 g (0.16 moles) of glutaric anhydride at room temperature in an atmosphere of nitrogen, followed by further agitation for 1 hour. Subsequently, 202 g (2 moles) of triethylamine and 255 g (2.5 moles) of acetic anhydride were dropped into the solution. After agitation for 20 hours at room temperature, there was obtained a light yellow slurry. The slurry was filtered and washed with methanol, after which the product was removed by filtration and dried at 180° C. for 8 hours to obtain 837 g of a light yellow polyimide powder. The polyimide powder had a logarithmic viscosity of 0.55 dl/g. It will be noted that the logarithmic viscosity is a value which was determined by dissolving 0.5 g of polyimide powder in 100 ml of a solvent (p-chlorophenol:phenol =90:10 on the weight basis) under heating conditions, cooling and measuring at 35° C. The polyimide powder had a glass transition temperature of 275° C. (as measured by the DSC method) and a 5% weight loss temperature of 545° C. (as measured by the DTA-TG method).

Figure 19:
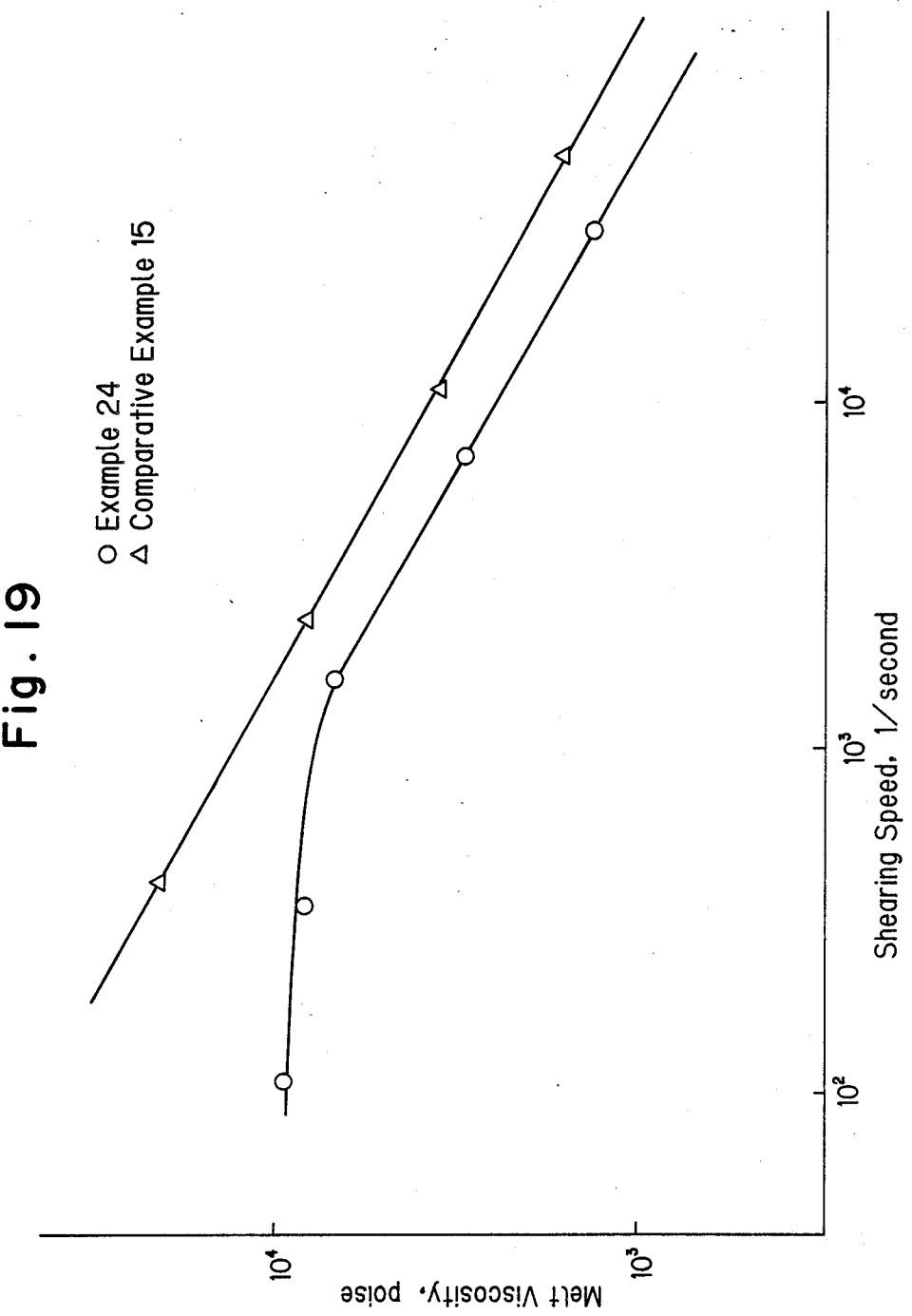

The polyimide powder obtained in this example was subjected to measurement of the relation between the melt viscosity and the pressure (shearing speed) by the use of the Koka type flow tester (CFT-500, made by Shimadzu Co., Ltd.) using an orifice with a diameter of 0.1 cm and a length of 1 cm. FIG. 19 shows the relation between the melt viscosity and the shearing speed where the melt viscosity was measured by changing the shearing speed after heating at 370° C. for 5 minutes.

COMPARATIVE EXAMPLE 15

Example 24 was repeated except that the glutaric anhydride was not reacted, thereby obtaining 830 g of a polyimide powder.

The thus obtained polyimide powder was subjected to determination of the relation between the melt viscosity and the shearing speed by the use of a flow tester in the same manner as in Example 24.

EXAMPLE 25

632 g (1.0 mole) of 4,4'-bis[4-(4-amino-$\alpha$, $\alpha$-dimethylbenzyl)phenoxy] benzophenone and 4840 g of dimethylacetamide were charged into a reactor apparatus as used in Example 24, to which 12.3 g (0.08 moles) of 1,2-cyclohexanedicarboxylic anhydride and 210 g (0.96 moles) of pyromellitic dianhydride were added at room temperature in an atmosphere of nitrogen while not allowing the temperature of the solution to increase, followed by agitation at room temperature for about 20 hours.

Thereafter, 202 g (2 moles) of triethylamine and 255 g (2.5 moles) of acetic anhydride were dropped into the solution. After agitation for further 20 hours, there was obtained a light yellow slurry. The slurry was filtered, washed with methanol and dried at 180° C. for 8 hours under reduced pressure to obtain 786 g of a light yellow polyimide powder. The polyimide powder had a glass transition temperature of 235° C. and a logarithmic viscosity of 0.58 dl/g.

Figure 20:
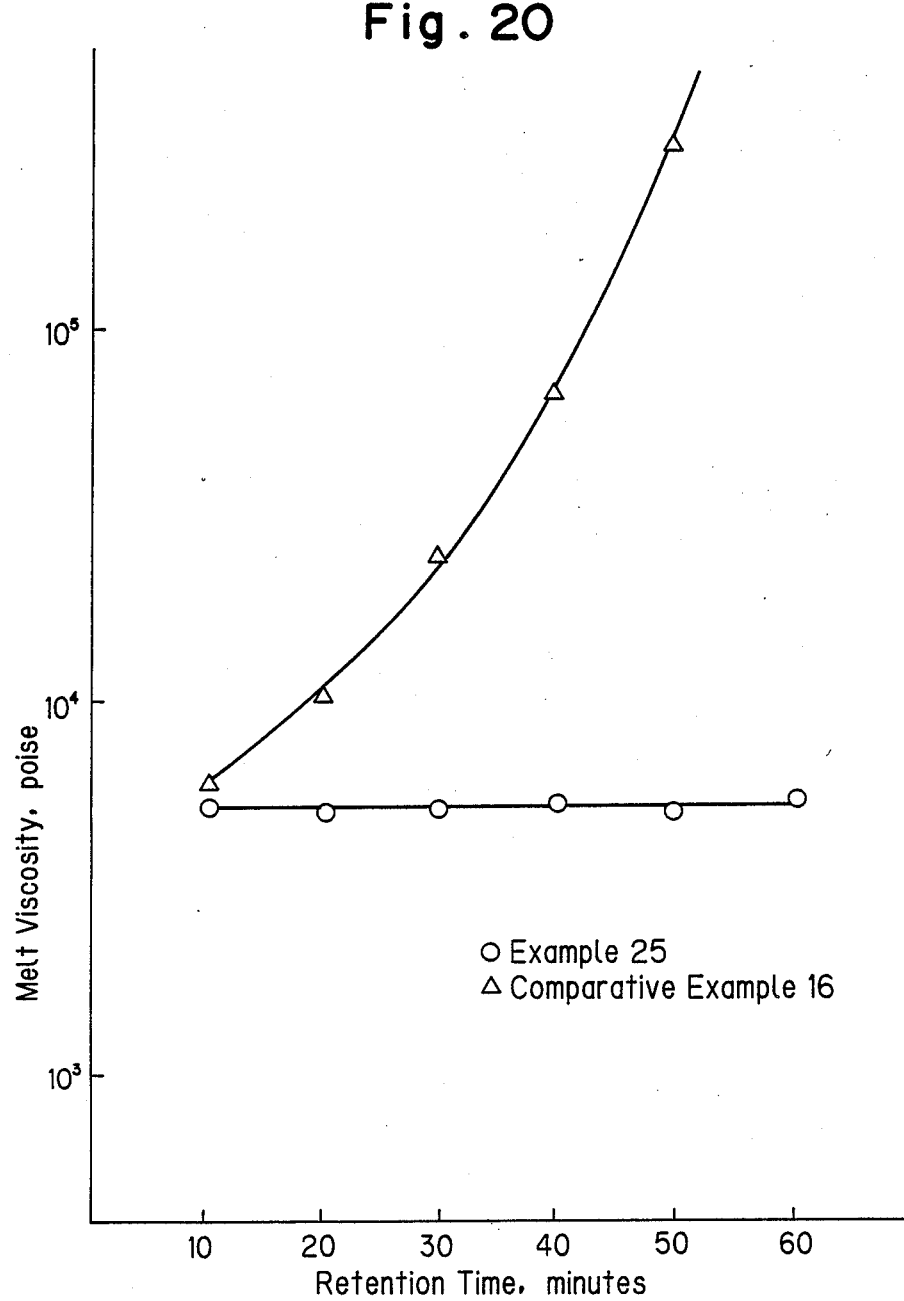

The forming stability of the polyimide obtained in this example was measured by changing the retention time in the cylinder of a flow tester. The temperature used was 340° C. and the pressure was 100 kg/cm$^2$. The results are shown in FIG. 20. The increase in the retention time in the cylinder involved little change in the melt viscosity, revealing good thermal stability.

COMPARATIVE EXAMPLE 16

In the same manner as in Example 25 without use of the 1,2-cyclohexanedicarboxylic anhydride, there was obtained a light yellow polyimide powder.

The polyimide powder had a glass transition temperature of 235° C. and a logarithmic viscosity of 0.58 dl/g. In the same manner as in Example 25, the retention time in the cylinder of the flow tester was changed to measure melt viscosity, with the result that the melt viscosity increased with an increasing retention time, thus the thermal stability being poorer when compared with the polyimide obtained in Example 25.

EXAMPLE 26

668 g (1.0 mole) of bis{4-[4-(4-amino-$\alpha$, $\alpha$-dimethylbenzyl)phenoxy]phenyl} sulfone, 300.7 g (0.97 moles) of bis(3,4-dicarboxyphenyl) ether dianhydride, 6.7 g (0.06 moles) of citraconic anhydride and 5500 g of m-cresol were charged into a reactor as used in Example 24, and heated under agitation in an atmosphere of nitrogen. After heating to 150° C., the agitation was continued for 2 hours and the resultant reaction product was discharged into methanol and filtered to obtain a polyimide powder.

The polyimide powder was washed with methanol and acetone and dried at 180° C. for 8 hours under reduced pressure to obtain 894 g of a polyimide powder.

The polyimide powder had a logarithmic viscosity of 0.61 dl/g and a glass transition temperature of 220° C. The measurement as in Example 21 was made at a temperature of 340° C. The results are shown in FIG. 21.

COMPARATIVE EXAMPLE 17

Example 26 was repeated except that the citraconic anhydride was not used, thereby obtaining a polyimide powder having a logarithmic viscosity of 0.61 dl/g.

Figure 21:
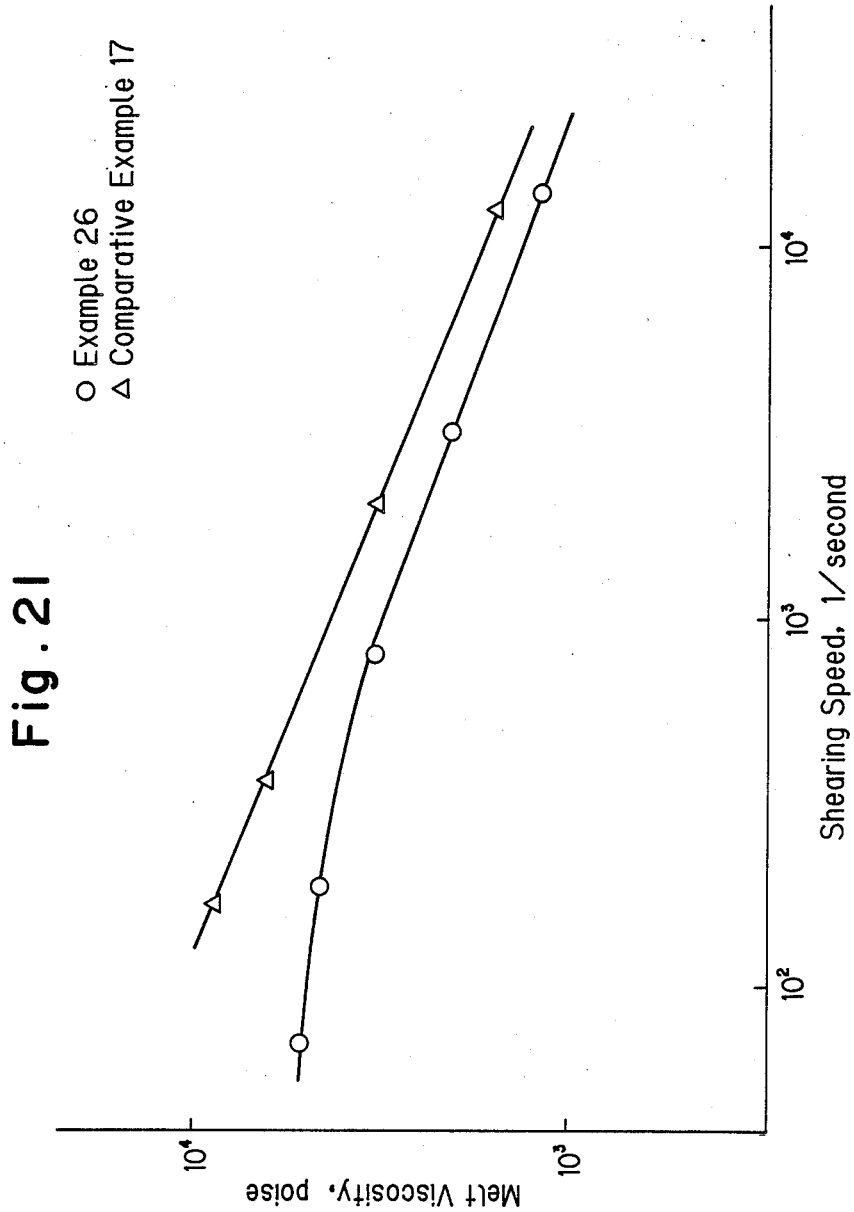

The measurement as in Example 24 was made at a temperature of 340° C., with the results shown in FIG. 21.

EXAMPLE 27

616.7 g (1.0 mole) of bis{4-[4-(4-aminophenoxy)phenoxy]phenyl} sulfone and 5215 g of N,N-dimethylacetamide were charged into a reactor equipped with an agitator, a reflux condenser and a nitrogen-introducing tube, to which 207.1 g (0.95 moles) of pyromellitic anhydride was added at room temperature in an atmosphere of nitrogen portion by portion while not allowing the temperature of the solution to increase, followed by agitation at room temperature for about 20 hours. The resultant polyamide acid had a logarithmic viscosity of 0.56 dl/g. The logarithmic viscosity was a value which was measured at 35° C. using N,N-dimethylacetamide as a solvent and a concentration of 0.5 g/100 ml of the solvent.

To the polyamide acid solution was added 17.6 g (0.155 moles) of glutaric anhydride at room temperature in an atmosphere of nitrogen, followed by further agitation for 1 hour. Subsequently, 202 g (2 moles) of triethylamine and 306 g (3 moles) of acetic anhydride were dropped into the solution. About 2 hours after completion of the dropping, a yellow polyimide powder started to precipitate. The solution was further agitated at room temperature for 20 hours, and the resultant reaction product was discharged into methanol and filtered, followed by dispersion in and washing with methanol, removal by filtration and drying at 180° C. for 2 hours to obtain 779 g of a polyimide powder. The polyimide powder had a glass transition temperature of 285° C. and a melting point of 420° C. (as determined by DSC herein and whenever appearing hereinafter).

Figure 22:
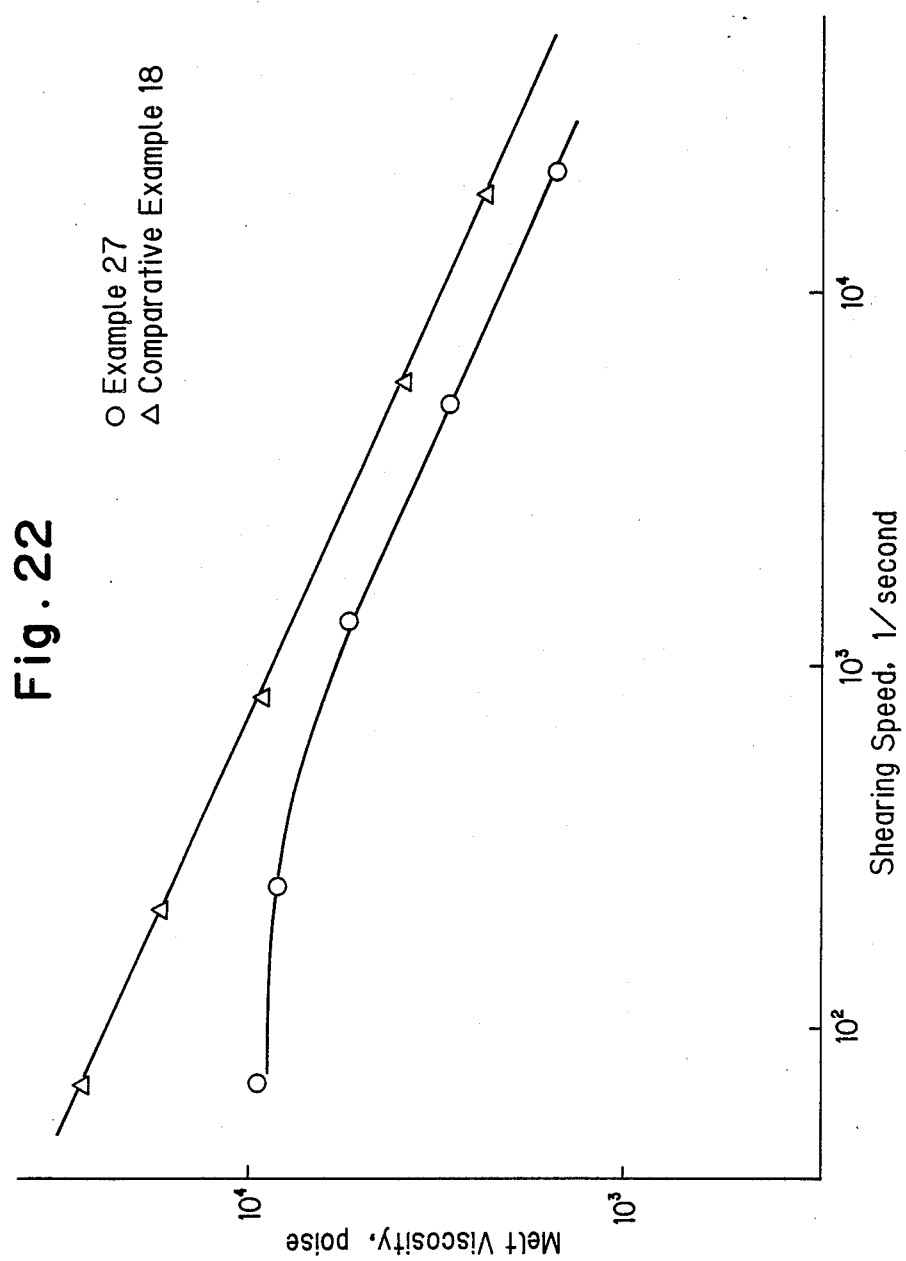

The polyimide powder obtained in this example was subjected to measurement of the relation between the melt viscosity and the pressure (shearing speed) by the use of the Koka type flow tester (CFT-500, made by Shimadzu Co., Ltd.) using an orifice with a diameter of 0.1 cm and a length of 1 cm. FIG. 22 shows the relation between the melt viscosity and the shearing speed wherein the melt viscosity was measured by changing the shearing speed after heating at a temperature of 440° C. for 5 minutes.

COMPARATIVE EXAMPLE 18

Example 27 was repeated except that the glutaric anhydride was not reacted, thereby obtaining 774 g of a polyimide powder.

The thus obtained polyimide was subjected to determination of the relation between the melt viscosity and the shearing speed by the use of a flow tester in the same manner as in Example 27. The results are shown in FIG. 22.

EXAMPLE 28

616.7 g (1.0 mole) of bis{4-[4-(4-aminophenoxy)-phenoxy]phenyl} sulfone and 5160 g of dimethylacetamide were charged into a reactor apparatus as used in Example 27, to which 15.4 g (0.1 mole) of 1,2-cyclohexanedicarboxylic anhydride and 279.3 g (0.95 moles) of 3,3',4,4'-biphenyltetracarboxylic dianhydride were added at room temperature in an atmosphere of nitrogen while not allowing the temperature of the solution to increase, followed by agitation at room temperature for about 20 hours. The resultant polyamide acid had a logarithmic viscosity of 0.51 dl/g.

Subsequently, 202 g (2 moles) of triethylamine and 306 g (3 moles) of acetic anhydride were dropped into the solution. After agitation for 20 hours, there was obtained a light yellow slurry. The slurry was filtered, washed with methanol and dried at 180° C. for 8 hours under reduced pressure to obtain 850 g of a light yellow polyimide powder. The polyimide powder had a glass transition temperature of 261° C.

Figure 23:
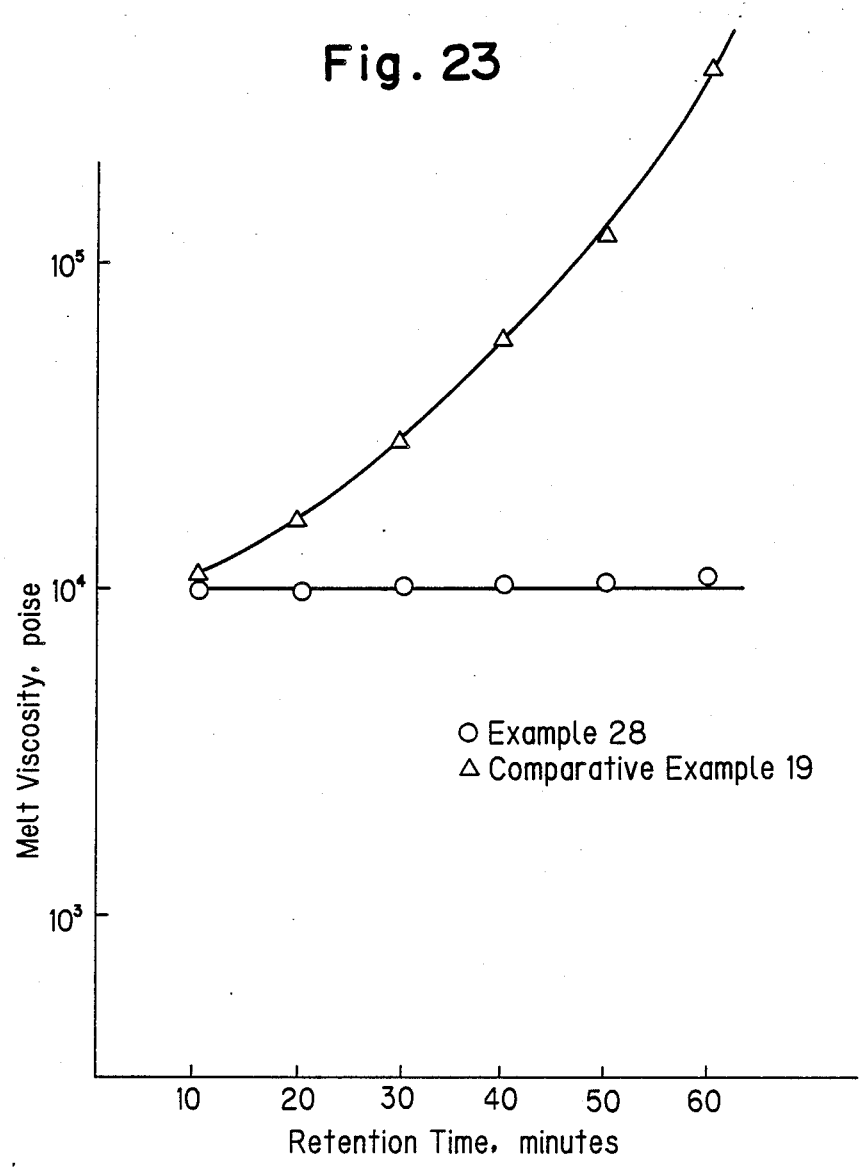

The forming stability of the polyimide obtained in this example was measured by changing the retention time in the cylinder of a flow tester. The temperature used was 380° C. and the pressure was 100 kg/cm². The results are shown in FIG. 23. The increase in the retention time in the cylinder involved little change in the melt viscosity, revealing good thermal stability.

COMPARATIVE EXAMPLE 19

In the same manner as in Example 28 without use of the 1,2-cyclohexanedicarboxylic anhydride, there was obtained a light yellow polyimide powder.

The polyimide powder had a glass transition temperature of 261° C. In the same manner as in Example 28, the retention time in the cylinder of the flow tester was changed to measure melt viscosity, with the result that the melt viscosity increased with an increasing retention time, thus the thermal stability being poorer when compared with the polyimide obtained in Example 28.

EXAMPLE 29

616.7 g (1.0 mole) of bis{4-[4-(4aminophenoxy)-phenoxy]phenyl} sulfone, 294.5 g (0.95 moles) of bis(3,4-dicarboxyphenyl) ether dianhydride, 11.2 g (0.1 moles) of citraconic anhydride and 5250 g of m-cresol were charged into a reactor as used in Example 27, and heated under agitation in an atmosphere of nitrogen. After continuing the agitation at 150° C. for 3 hours, the resultant reaction product was filtered to obtain a polyimide powder.

The polyimide powder was washed for purification with methanol and acetone.

The polyimide powder had a glass transition temperature of 235° C.

The measurement as in Example 27 was made at 360° C., with the results shown in FIG. 24.

As will be apparent from the foregoing, the process of the invention can provide polyimide resins which have good mechanical, thermal and electric properties along with a good solvent resistance. In addition, the polyimide resins are resistant to heat and are thermally stable over a long term with good forming processability.

We claim:

1. A process for preparing a polyimide which comprises reacting a diamine and a tetracarboxylic dianhydride to obtain a polyamide acid and subjecting the polyamide acid to conversion into a polyimide thermally or chemically, wherein the improvement comprises said diamine being at least one compound selected from the group consisting of 1,4-bis [4-(3-aminophenoxy) benzoyl] benzene, 1,3-bis [4-(3-aminophenoxy) benzoyl] benzene, bis {4-[4-(4-aminophenoxy)phenoxy] phenyl} sulfone, bis {4-[3-(4-aminophenoxy) benzoyl]phenyl} ether, 4,4'-bis [4-(4-amino-α,α-diamethylbenzyl) phenoxy]-benzophenone, and bis {4-[4-(4-amino-α,α-dimethylbenzyl)phenoxy]phenyl} sulfone, the reaction being carried out in the presence of at least one dicarboxylic anhydride selected from the group consisting of aliphatic dicarboxylic anhydrides and aromatic dicarboxylic anhydrides and the amount of the tetracarboxylic dianhydride is in the range of from 0.9 to 1.0 mole per mole of the diamine and the amount of the dicarboxylic anhydride is in the range of from 0.001 to 1.0 mole per mole of the diamine.

2. A process according to claim 1, wherein the aliphatic dicarboxylic anhydride is at least one member of the following formula (VI)

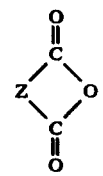

(VI)

wherein Z represents a divalent group selected from the group consisting of aliphatic groups having from 1 to 10 carbon atoms and alicyclic groups.

3. A process according to claim 1, wherein said aromatic dicarboxylic anhydride is at least one member of the following formula (VII)

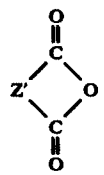

(VII)

wherein Z' represents a divalent group selected from the group consisting of monocyclic aromatic groups, condensed polycyclic aromatic groups and non-condensed polycyclic aromatic groups where aromatic groups are connected to each other directly or through crosslinkage.

4. A process according to claim 1, wherein the molar ratio of the dicarboxylic anhydride to the diamine is in the range of 0.01 to 0.5:1.

* * * * *

UNITED STATES PATENT AND TRADEMARK OFFICE
CERTIFICATE OF CORRECTION

PATENT NO. : 4,937,316

DATED : Jun. 26, 1990

INVENTOR(S) : Masahiro Ohta, et al.

It is certified that error appears in the above-identified patent and that said Letters Patent is hereby corrected as shown below:

On the title page, in item [73], the assignee should be corrected to read as follows:

--Mitsui Toatsu Chemicals, Inc., Tokyo, Japan--.

On the title page, before item [57], the Attorney, Agent, or Firm should be corrected to read as follows:

--Attorney, Agent, or Firm—Burns, Doane, Swecker & Mathis--

Signed and Sealed this

Fifth Day of May, 1992

Attest:

DOUGLAS B. COMER

Attesting Officer

Acting Commissioner of Patents and Trademarks